(12) United States Patent
Daynes

(10) Patent No.: US 6,343,339 B1
(45) Date of Patent: Jan. 29, 2002

(54) METHOD AND APPARATUS THAT UTILIZES STATE LOCKS TO LOCK RESOURCES

(75) Inventor: Laurent Daynes, Sunnyvale, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/693,354

(22) Filed: Oct. 20, 2000

Related U.S. Application Data

(63) Continuation of application No. 09/108,064, filed on Jun. 30, 1998, now Pat. No. 6,182,186.

(51) Int. Cl.[7] .............................................. G06F 13/00
(52) U.S. Cl. ........................ 710/200; 710/240; 710/108
(58) Field of Search .................................. 710/240, 107, 710/108, 36, 200, 220; 711/147, 150, 151, 152; 707/1, 200, 201, 8, 9; 364/228.1, 246.8

(56) References Cited

U.S. PATENT DOCUMENTS

| | | | |
|---|---|---|---|
| 5,115,499 A | * | 5/1992 | Stiffler et al. |
| 5,263,161 A | * | 11/1993 | Barth et al. |
| 5,297,283 A | * | 3/1994 | Kelly et al. |
| 5,313,641 A | * | 5/1994 | Simcoe et al. ............... 710/242 |
| 5,440,743 A | * | 8/1995 | Yokota et al. ............... 710/200 |
| 5,450,595 A | * | 9/1995 | Chen et al. ..................... 707/1 |
| 5,692,178 A | * | 11/1997 | Shaughnessy |
| 5,832,483 A | * | 11/1998 | Barker ........................... 707/8 |

OTHER PUBLICATIONS

Laurent Daynés, Olivier Gruber, Patrick Valduriez, Locking in OODBMS Client Supporting Nested Transactions, Proceedings of the Eleventh International Conference on Data Engineering, Mar. 6–10, 1995, Taipei, Taiwan.

Vibby Gottemukkala, Tobin J. Lehman, Locking and Latching in a Memory–Resident Database System, Proceedings of the 18th VLDB Conference, 1992, Vancouver, British Columbia, Canada.

(List continued on next page.)

*Primary Examiner*—Ario Etienne
(74) *Attorney, Agent, or Firm*—The Hecker Law Group

(57) ABSTRACT

Method and apparatus for locking by sharing lock states. Each resource is associated with a lock state that represents its lock. Lock states are made of one set of transactions per locking mode. Resources may share the same lock state if the state of their respective locks is equal. Locking operations change the association between a resource and a lock state to reflect changes to the resource's lock. In one embodiment, a table of immutable lock states (TILS) record the immutable lock states that were created by lock operations in order to avoid duplication of lock states with equal value. Locking operations (acquire and release) on a resource R by a transaction T compute a new lock state value by adding (acquire) or removing (release) T from the lock state associated with R, consult the TILS to retrieve an immutable lock state corresponding to the computed value (and registers one if none was found), and change R's association to refer to the lock state returned by the TILS. In one embodiment, lock state computations are cached to avoid both computation of lock states and look up to the TILS. Each transaction maintains one lock state computation cache per locking operation. Transactions keep track of resources they obtain a lock for using a lock set (which may be implemented as a stack). Alternatively, lock sets may be avoided if the TILS is scanned upon transaction completion to determine the lock states that contained the transaction in one of their sets.

21 Claims, 13 Drawing Sheets

OTHER PUBLICATIONS

Laurent Daynés, Malcolm P. Atkinson, Patrick Valduriez, Efficient support for customizing concurrency control in Persistent Java, Proceedings of the International Workshop on Advanced Transaction Models and Architectures (ATMA), in conjunction with VLDB '96, Sep. 1996, Goa, India.

A. Biliris, S. Dar, N. Gehani, H.V. Jagadish, K. Ramamritham, Asset: A System for Supporting Extended Transactions, Proceedings of ACM–SIGMOD 1994 International Conference on Management of Data, May 1994, pp. 44–54, Minneapolis, Minnesota.

Hal Berenson, Philip A. Bernstein, Jim Gray, Jim Melton, Elizabeth J. O'Neil, Patrick E. O'Neil, A Critique of ANSI SQL Isolation Levels, Proceedings of the 1995 ACM SIGMOD International Conference on Management of Data, May 22–25, 1995, San Jose, California, SIGMOD Record vol. 24, No. 2.

Roger Barga, Carlton Pu, A Practical and Modular Method to Implement Extended Transaction Models, Proceedings of the $21^{st}$ VLDB Conference, 1995, Zurich, Switzerland.

J. Gray, A. Reuter, Isolation Concepts, Transaction Processing Concept and Techniques, 1993, Chapter 7.

Vibby Gottemukkala, Tobin J. Lehman, Locking and Latching in a Memory–Resident Database System, Proceedings of the $18^{th}$ International Conference on Very Large Data Bases, Aug. 1992, pp. 533–545, Vancouver, British Columbia, Canada.

William E. Snaman, Jr., David W. Thiel, The VAX/VMS Distributed Lock Manager, Digital Technical Journal, Sep. 1987, pp. 29–44, vol. 1, No. 5.

Laurent Daynés, Towards Low Space Overhead, Fast, Customizable, Object Locking, Mar. 21, 1998.

Paul Jensen, Nandit Soparkar, Malek Tayara, Towards Distributed Real–Time Concurrency and Coordination Control, Advanced Transaction Models and Architectures, 1997.

Joshua J. Bloch, The Camelot Library, Camelot and Avalon—A Distributed Transaction Facility, 1991, pp. 47–49, Morgan Kaufmann Publishers, Inc., San Mateo, California.

Joshua J. Bloch, The Design of the Camelot Library, Camelot and Avalon—A Distributed Transaction Facility, 1991, pp. 180–182, Morgan Kaufmann Publishers, Inc., San Mateo, California.

"Concurrency Filter" IBM Technical Disclosure Bulletin, US, IBM Corp. New York, vol. 34, No. 2, pp. 333–339 XP000211129 ISSN: 0018–8689.

* cited by examiner-

```
            ! %l0  : resource on which a read lock is requested
            ! %l1  : Execution environment (EE) of the current thread. Contains locking context
            ! %l0  : location of the lock state pointer in the resource
            ! %l1  : presumed current lock state of the resource
     1   add %l0, OFFSET_TO (BOTHandle, lock), %l0          ! load location of lock state
     2   set READ_LOCK_FN_BASE_ADDRESS, %l3                 ! load base for dispatch
     3   ld [%l0], %l1                                      ! load the lock, is never null
         redispatch:
     4   ld [%l1 + OFFSET_ID (LockState, readop_type)], %o3 ! load offset from lock state's type
     5   jmp %l3 + %o3                                      ! dispatch
     6   ld [%i1 + OFFSET_ID (EE, sro_lock_state)], %l2     ! load this transaction's SRO lock state.
            !
         unlocked_state:
     7   ld [%i1 + OFFSET_TO (EE, unlocked_lock_state)], %o2 ! load the unlocked state for comparison
            ! According to dispatching, we are here because the lock state that was read is the unloced state.
            ! A non-blocking synchronization scheme is used to set the SRO lock state of the current locking context.
            ! The atomic test and set instruction cas should set %l2 to %o2 for the operation to succeed.
            ! If something different from %o2 to stored in %l2, it means another transaction has set its
            ! own lock in the meantime, so we must retry the operation and re-dispatch
            ! to the case that corresponds to the new lock state (stored in %l2).
     8   case [%l0], %o2, %l2
     9   amp %o2, %l2
    10   be lockset_update                                  ! Branch if lock is acquired
    11   ld [%i1, OFFSET_IO (ee, LOCKSET_TOP)], %l2
    12      ! Otherwise, move new lock state value in register %l1 for re-dispatch.
    13   be redispatch
    14   or %l2, %g0, %l1
            ...
         lockset_update:
            ...
```

FIG. 13

METHOD AND APPARATUS THAT UTILIZES STATE LOCKS TO LOCK RESOURCES

This application is a continuation of application Ser. No. 09/108,064 filed Jun. 30, 1998, U.S. Pat. No. 6,182,186.

BACKGROUND OF THE INVENTION

1. Field of the Invention

This invention relates to the field of computer software, and, more specifically, to transaction processing and object or resource locking.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever. Sun, Sun Microsystems, the Sun logo, Solaris, Java, JavaOS, JavaStation, HotJava Views and all Java-based trademarks and logos are trademarks or registered trademarks of Sun Microsystems, Inc. in the United States and other countries.

2. Background Art

In modern computing environments, it is commonplace to store and access a variety of diverse information and data. To efficiently utilize the information, the information is stored in a database and is structured in a manner that provides a user with the ability to interpret and manipulate the information (referred to as a "data structure"). One type of database structure is in the form of a table, where each row of the table contains a record and each column specifies a field in the record. For example, a table can be used to store information regarding a company's inventory where each record is a specific item in the inventory and each field specifies information about the item (e.g., the name of the product, the price of the product, etc.). Data structures may vary depending on the application and type of database utilized. As a result of the diverse types of information being utilized (e.g., text, images, sound, video, etc.), data structures have grown increasingly complex.

Each time a computer system performs an activity, the activity is referred to as a transaction. For example, when a customer order is entered, or an inventory item is updated, a transaction for each activity is executed by the computer system. Thus, when information in a data structure is accessed or manipulated, a transaction is executed by the computer system. A transaction may need access to a record in a database or a portion of information in a database. Alternatively, a transaction may modify the entire database. When executing transactions, a computer system may execute a group of transactions at one time (referred to as batch processing), or may execute each transaction immediately after the transaction is received by the system (referred to as transaction processing). Transactions contain certain properties that must be adhered to. For example, transactions must be isolated such that each transaction must be contained separately from each other transaction. Additionally, transactions must provide for recoverability (the ability to establish a previous or new status from which execution can be resumed in the event of a system or execution failure ). Required transaction properties are also referred to as low level details of a transaction.

In many modern applications, increasingly complex data structures coupled with transaction processing capabilities is becoming a common requirement. The complexity of these applications, in terms of the data structures, algorithms, and type of the transactions used, does not fit well in the framework offered by traditional database systems. Persistent programming languages (PPL) (programming languages that provide for data to have a lifetime that persists for a specified amount of time) that support transaction processing may be utilized by programmers as an alternative or in combination with traditional database systems. To provide adequate support, some PPLs automatically enforce required transaction properties. Thus, low level transaction details (e.g., enforcing a transaction's properties) are automatically performed without input from a programmer.

One automated low level detail consists of the acquisition and release of a lock. A lock is a mechanism that restricts use of a resource to the holder of the lock. By locking a resource, the integrity of the data in the resource is ensured by preventing more than one user (or transaction) from accessing or changing the same data or object at the same time. There are several types of locks that may be used.

One type of lock is a shared lock. A shared lock permits multiple transactions to read (view) an item simultaneously without any modification or addition to the item (no writing is permitted). A shared lock is referred to as permitting concurrent (or concurrency) control by a transaction (i.e., multiple transactions are permitted to concurrently access a resource). Another type of lock is an exclusive lock. An exclusive lock permits one transaction to read and write to an item while excluding all other transactions from reading or writing to the item.

The locking and unlocking of resources must be administered to ensure that any required lock properties are complied with. For example, two or more different transactions cannot each acquire an exclusive lock at the same time for the same resource. Additionally, locks must be administered to provide a queue for transactions that are waiting to acquire a lock, and to rollback any executed actions if a deadlock results (i.e., when each of two transactions are waiting for a lock release from the other before continuing). For example, a deadlock occurs if transaction 1 has a lock on resource A and is waiting to acquire a lock on resource B, and transaction 2 has a lock on resource B and is waiting to acquire a lock on resource A.

A locking protocol partially determines the administration of a locking and unlocking of resources. A locking protocol determines how and when a transaction is granted (or acquires) a lock for a resource and when the resource is unlocked (i.e., the lock is released allowing other transactions to acquire a lock on that resource). A lock manager administers a locking protocol.

For example, in a two-phase locking protocol, each transaction issues a lock and unlock request in two phases. In one phase, referred to as the growing phase, a transaction may obtain locks but may not release any lock. In the second phase, referred to as the shrinking phase, a transaction may release locks but may not obtain any new locks.

Another protocol, referred to as a graph-based protocol, a partial ordering of information in a database is performed. For example, a set R of resources consisting of $R_1$, $R_2$, $R_3$, ..., $R_h$ is ordered such that $R_i \rightarrow R_j$. In this manner, any transaction accessing both $R_i$ and $R_j$ must access $R_i$ before accessing $R_j$. With this ordering, the set R may be viewed as a directed acyclic graph, called a database or resource graph. A directed graph may be viewed as the tree of FIG. 2, where each node of the tree is a resource. Each resource descends from another resource (referred to as a parent resource) up to the root of the tree that has no parents (resource A 200). In a graph-based protocol, the following rules are followed: (1) the first lock by a transaction T may be on any data item, (2) subsequently, a data item or resource R can be locked by T only if the parent of R is currently locked by T, (3) resources can be unlocked at any time, and (4) a resource that has been locked and unlocked by T cannot subsequently be relocked by T. For example, referring to FIG. 2, if T needs access to resource C 204, both resource C 204 and resource A 200 must be locked. Similarly, if T needs access to resource J 218, in addition to locking resource J 218, all of the parents of resource J 218 must be locked (i.e., resources H 214, D 208, B 202, and A 200). Thus, in some cases, a transaction must lock resources that it does not access (i.e., the parent resources of a resource being accessed).

FIG. 3 demonstrates an example of lock acquisition according to a traditional protocol. In the traditional protocol, each resource is allocated a lock data structure. This lock data structure is updated every time a lock operation changes the state of the resource's lock. FIG. 3 demonstrates a scenario where two resources, $O_1$ 300 and $O_2$ 302, have been read by a transaction $T_1$, and $O_2$ 302 is about to be read by transaction $T_2$. The state of the lock of each resource is shown before (304–306) and after (308–310) the acquisition of the lock on $O_2$ 302 by $T_2$. When transaction $T_2$ requests the lock on resource $O_2$ 302 in read mode, the lock data structure associated with $O_2$ 302 is updated to reflect the new lock state (i.e., lock owned by $T_1$ and $T_2$ in read mode).

Each of the lockable resources may be a record in a database, a field of a record, an entire database, or in an object oriented system (discussed in detail below) a single object, for example. The size or level of the lockable resource is referred to as the granularity of the resource (e.g., the field level v. the record level v. the table level).

A lock is comprised of a data structure that records the identity of the transactions that are given the right to execute operations on the resource the lock protects. Each time a lock is acquired, memory is used for the lock data structure. The memory utilized by the lock remains unavailable until released through garbage collection or some other method. Consequently, one goal in lock administration is to minimize the memory locks consume, which usually translates in minimizing the number of locks.

The process of creating and manipulating a lock is time consuming. Thus, another goal in lock processing is to minimize the lock processing cost for acquiring and releasing a lock.

As resource granularity becomes finer, more resources are available for transactions. Such resource availability occurs because locks are placed on smaller resource units, freeing remaining resources that may be locked if the resource is coarser. Consequently, another objective in lock processing is to utilize a fine resource granularity.

Locking may be performed manually by programmers who then explicitly put lock requests in their programs, or automatically at runtime without input from programmers. When applied in the context of general purpose programing languages, both solutions may result in many unnecessary redundant lock requests (i.e., a lock request for a lock already owned) because of the complex data structures and algorithms these programming languages enable. Consequently, one goal of lock management is to minimize the processing time spent to process redundant lock requests.

The objective of a lock management implementation is to obtain the best combination of low memory consumption, low processing costs, and fine granularity of locking.

SUMMARY OF THE INVENTION

The present invention provides for low space-overhead locking for transaction processing systems by sharing lock states. Each resource or object has an associated lock state. A lock state is comprised of a set of transactions that own a lock in a specific mode. Among other modes, a locking mode may comprise a read mode or a write mode.

Resources may share the same lock state if the state of their respective lock is equal. During its lifetime, a resource may be associated with various lock states, each lock state being the representation of the lock of that resource at a given time. Locking operations change the association between a resource and a lock state, should such a change be necessary.

In one embodiment of the invention, a table of immutable lock states (TILS) records all of the immutable lock states that were created by lock operations in order to avoid duplication of lock states with equal value. Locking operations (e.g., acquire, release) that yield new lock state values must consult the TILS to retrieve the corresponding immutable lock state.

To acquire a lock on a resource R, after ensuring that there is no conflicts, the value of a new lock state is computed by adding the current transaction to the lock state currently associated with R. The computed lock state value is used to retrieve an immutable lock state from the TILS (if no such lock state exists, a new one is registered to the TILS and is returned). The lock acquisition completes by updating the association of the resource to the new lock states returned by the TILS.

To release a lock for a specific resource, the transaction determines the lock state value that will result after removing itself from the lock state for that resource. The computed lock state value is used to retrieve an immutable lock state from the TILS (if no such lock state exists, a new one is registered to the TILS and is returned). The lock release completes by updating the association of the resource to the new lock states returned by the TILS.

As described, all lock operations perform transitions of lock states that are both deterministic and independent of the locked resource. If a locking operation for a transaction T on a lock state S1 yields a state S2, it will always do so, independently of the resource the operation applies to. For instance, acquiring a read lock for a transaction T1 on a resource R associated with a lock state consisting of a read owner set that contains T2 will always yield a lock state made of a lock owner set that contains T2 and T1, whatever the resource R is. In one embodiment of the invention, lock state transitions (e.g., acquire (T1, Read): Owner(Read)={T2}→Owner(Read)={T2,T1}) are cached to avoid both computation of lock states and look up in the TILS. Each transaction maintains one lock state transition cache per locking operation.

When a transaction has completed execution, all resources associated with the transaction must be released. In one embodiment, the transaction maintains a lock set that maintains information regarding each resource for which it has obtained a lock. The transaction then releases each resource in the lock set as described above. In one embodiment, the lock set is implemented in a stack where each reference is pushed onto the stack when the lock is acquired and popped when the lock is released. In another embodiment, lock sets are not maintained and the TILS is scanned upon transaction completion to determine which lock states contained the transaction as an owner.

BRIEF DESCRIPTION OF THE DRAWINGS

FIG. 13 demonstrates dispatching to specialized code and non-blocking synchronizations according to one embodiment of the invention.

DETAILED DESCRIPTION OF THE INVENTION

The invention is a method and apparatus for low space overhead locking for transaction systems. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.
Embodiment of Computer Execution Environment (Hardware)

Figure 1:
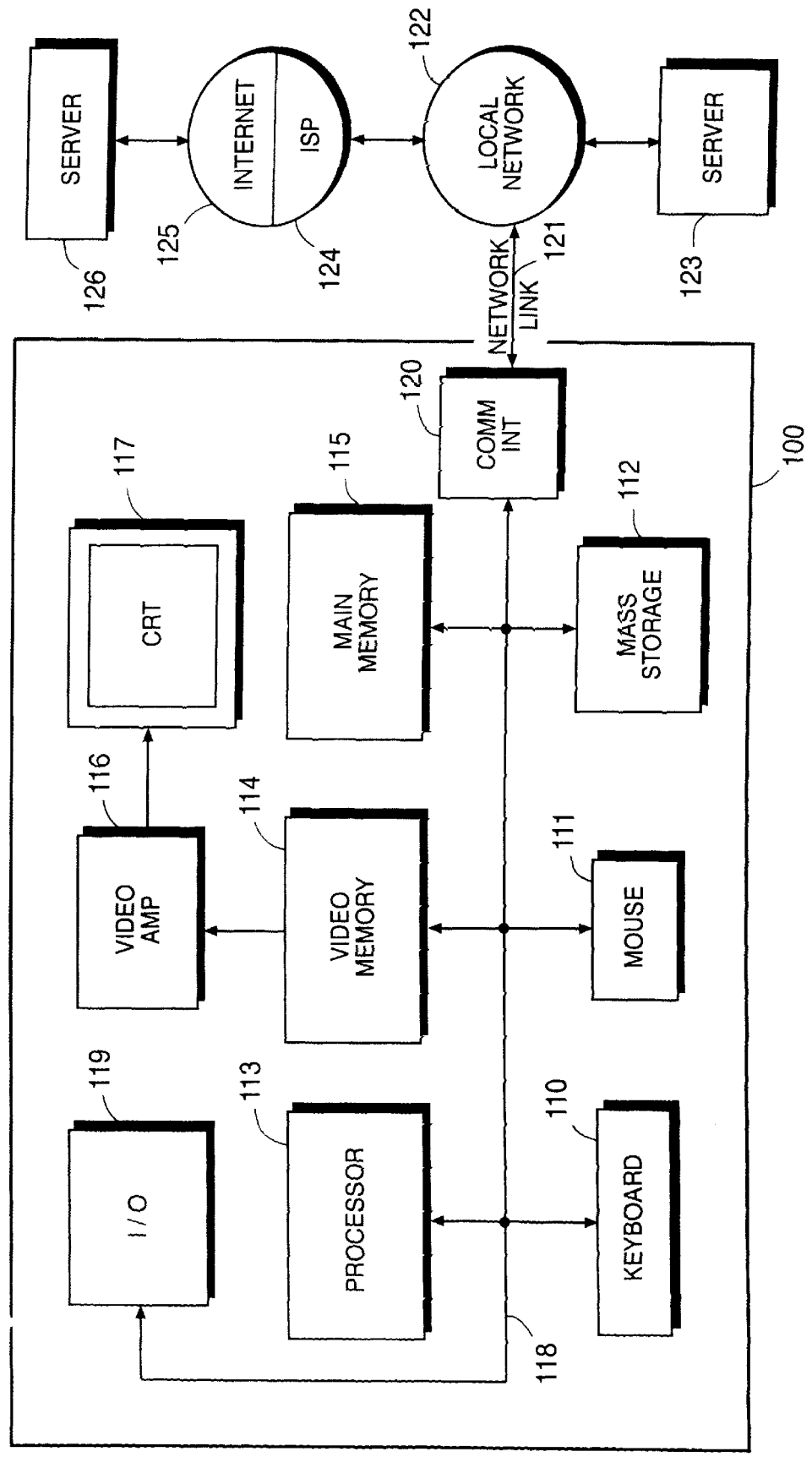
FIG. 1 is a block diagram of one embodiment of a computer system capable of providing a suitable execution environment for an embodiment of the invention.
Figure 2:
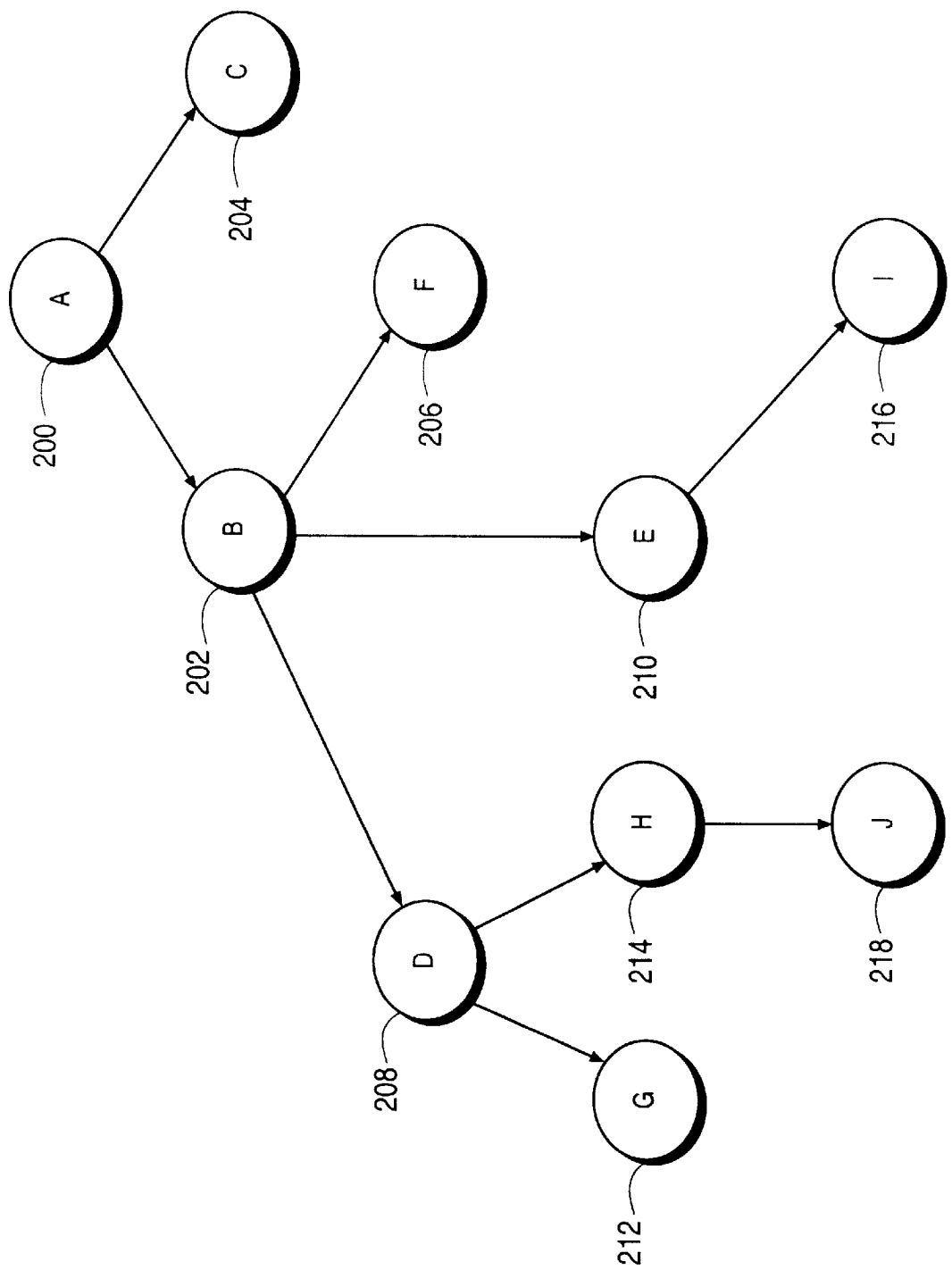
FIG. 2 demonstrates a tree for a graph based locking protocol.

An embodiment of the invention can be implemented as computer software in the form of computer readable code executed on a general purpose computer such as computer 100 illustrated in FIG. 1, or in the form of bytecode class files running on such a computer. A keyboard 110 and mouse 111 are coupled to a bi-directional system bus 118. The keyboard and mouse are for introducing user input to the computer system and communicating that user input to processor 113. Other suitable input devices may be used in addition to, or in place of, the mouse 111 and keyboard 110. I/O (input/output) unit 119 coupled to bi-directional system bus 118 represents such I/O elements as a printer, A/V (audio/video) I/O, etc.

Computer 100 includes a video memory 114, main memory 115 and mass storage 112, all coupled to bi-directional system bus 118 along with keyboard 110, mouse 111 and processor 113. The mass storage 112 may include both fixed and removable media, such as magnetic, optical or magnetic optical storage systems or any other available mass storage technology. Bus 118 may contain, for example, thirty-two address lines for addressing video memory 114 or main memory 115. The system bus 118 also includes, for example, a 32-bit data bus for transferring data between and among the components, such as processor 113, main memory 115, video memory 114 and mass storage 112. Alternatively, multiplex data/address lines may be used instead of separate data and address lines.

In one embodiment of the invention, the processor 113 is a microprocessor manufactured by Motorola, such as the 680X0 processor or a microprocessor manufactured by Intel, such as the 80X86, or Pentium processor. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Video amplifier 116 is well known in the art and may be implemented by any suitable apparatus. This circuitry converts pixel data stored in video memory 114 to a raster signal suitable for use by monitor 117. Monitor 117 is a type of monitor suitable for displaying graphic images.

Computer 100 may also include a communication interface 120 coupled to bus 118. Communication interface 120 provides a two-way data communication coupling via a network link 121 to a local network 122. For example, if communication interface 120 is an integrated services digital network (ISDN) card or a modem, communication interface 120 provides a data communication connection to the corresponding type of telephone line, which comprises part of network link 121. If communication interface 120 is a local area network (LAN) card, communication interface 120 provides a data communication connection via network link 121 to a compatible LAN. Wireless links are also possible. In any such implementation, communication interface 120 sends and receives electrical, electromagnetic or optical signals which carry digital data streams representing various types of information.

Network link 121 typically provides data communication through one or more networks to other data devices. For example, network link 121 may provide a connection through local network 122 to local server computer 123 or to data equipment operated by an Internet Service Provider (ISP) 124. ISP 124 in turn provides data communication services through the world wide packet data communication network now commonly referred to as the "Internet" 125. Local network 122 and Internet 125 both use electrical, electromagnetic or optical signals which carry digital data streams. The signals through the various networks and the signals on network link 121 and through communication interface 120, which carry the digital data to and from computer 100, are exemplary forms of carrier waves transporting the information.

Computer 100 can send messages and receive data, including program code, through the network(s), network link 121, and communication interface 120. In the Internet example, remote server computer 126 might transmit a requested code for an application program through Internet 125, ISP 124, local network 122 and communication interface 120. In accord with the invention, one such application is that of remotely configuring a computer.

The received code may be executed by processor 113 as it is received, and/or stored in mass storage 112, or other non-volatile storage for later execution. In this manner, computer 100 may obtain application code in the form of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Utilization of Computer Software

Resources and transactions may contain multiple related functions and data structures. One embodiment of the invention utilizes a standard object oriented programming (OOP) language to write and encapsulate an application's transactions, functions, and data structures. To provide an understanding of encapsulation of related data structures and methods, an overview of object-oriented programming is provided below.

Object-Oriented Programming

Object-oriented programming is a method of creating computer programs by combining certain fundamental building blocks, and creating relationships among and between the building blocks. The building blocks in object-oriented programming systems are called "objects." An object is a programming unit that groups together a data structure (one or more instance variables) and the operations (methods) that can use or affect that data. Thus, an object consists of data and one or more operations or procedures that can be performed on that data. The joining of data and operations into a unitary building block is called "encapsulation."

An object can be instructed to perform one of its methods when it receives a "message." A message is a command or instruction sent to the object to execute a certain method. A message consists of a method selection (e.g., method name) and a plurality of arguments. A message tells the receiving object what operations to perform.

One a advantage of object-oriented programming is the way in which methods are invoked. When a message is sent to an object, it is not necessary for the message to instruct the object how to perform a certain in method. It is only necessary to request that the object execute the method. This greatly simplifies program development.

Object-oriented programming languages are predominantly based on a "class" scheme. The class-based object-oriented programming scheme is generally described in Lieberman, "Using Prototypical Objects to Implement Shared Behavior in Object-Oriented Systems," OOPSLA 86 Proceedings, September 1986, pp. 214–223.

A class defines a type of object that typically includes both variables and methods for the class. An object class is used to create a particular instance of an object. An instance of an object class includes the variables and methods defined for the class. Multiple instances of the same class can be created from an object class. Each instance that is created from m the object class is said to be of the same type or class.

To illustrate, an employee object class can include "name" and "salary" instance variables and a "set_salary" method. Instances of the employee object class can be created, or instantiated for each employee in an organization. Each object instance is said to be of type "employee." Each employee object instance includes "name" and "salary" instance variables and the "set_salary" method. The values associated with the "name" and "salary"variables in each employee object instance contain the name and salary of an employee in the organization. A message can be sent to an employee's employee object instance to invoke the "set_salary" method to modify the employee's salary (i.e., the value associated with the "salary" variable in the employee's employee object).

A hierarchy of classes can be defined such that an object class definition has one or more subclasses. A subclass inherits its parent's (and grandparent's etc.) definition. Each subclass in the hierarchy may add to or modify the behavior specified by its parent class. Some object-oriented programming languages support multiple inheritance where a subclass may inherit a class definition from more than one parent class. Other programming languages support only single inheritance, where a subclass is limited to inheriting the class definition of only one parent class.

An object is a generic term that is used in the object-oriented programming environment to refer to a module that contains related code and variables. A software application can be written using an object-oriented programming language whereby the program's functionality is implemented using objects. The encapsulation provided by objects in an object-oriented programming environment may be extended to the notion of resources, locks and lock states as described below. Object locking provides for the association of each object with a distinct lock.

Embodiment of Software Apparatus for Lock States

One embodiment of the invention provides for a method and apparatus for a lock manager to utilize lock states that represent the state of a lock.

As described above, a lock is a data structure that records the identity of the transactions that are given the right to execute operations on the resource the lock protects. The transactions recorded by a lock are called the owners of that lock. A transaction is recorded by the locking modes (e.g., read or write mode) the transaction is granted to. There is one locking mode defined per kind of operation (locking modes and operations are discussed below). As a result, a lock has one set of owners (transactions that are granted the lock) for each locking mode that the lock must keep track of. The set of the values of each of the owners of a lock is referred to as the state of a lock (or lock state).

As described above, prior art methods provide for the creation of locks in lock data structures. The present invention does not utilize locks with a material existence in the form of lock data structures but provides for immutable lock states (lock states that are not capable of or susceptible to change). Each lock state represents a particular state of one or more locks. Resources share the same immutable lock state if the state of their respective lock is equal. During its lifetime, a resource may be associated with various lock states, each lock state being the representation of the lock of that resource at a given time. Locking operations change the association between a resource and a lock state, should a change of state be necessary. This association materializes the resource's lock. Prior to granting a lock, a determination is made as to whether the lock to be granted conflicts with an existing lock.

Lock states may also be viewed as follows: a transaction T is granted the lock 1 protecting a resource R in a mode M according to some conflict detection function that determines whether the request <T,M> conflicts with the current state of the lock 1. When a lock 1 is granted in mode M to a transaction T, T is added to the owner set that corresponds to M to reflect the new state of the lock. Inversely, when a transaction releases a lock, it is removed from all the owner sets in which it appears. Examples of lock states are discussed below.

The role of the lock manager in a lock state environment is to maintain the correct association of locked resources and immutable lock states. For this purpose, the lock manager maintains an associative table of immutable lock states, we will refer to as the TILS hereafter. The TILS contains all of the available immutable lock states. To access an entry in the TILS, a key that is unique for every lock state in the table is utilized. One key that may be utilized is the value of the lock state itself since this is the only information known when changing the state of the lock of a resource. Lock states are added or removed from the TILS as needed. Garbage collection techniques determine unused lock states and remove them from the TILS.

As described above, lock states are immutable, and can therefore be shared between several resources. The association between a resource and a lock state is changed whenever a locking operation changes the state of a resource's lock. The most commonly used locking modes are read and write. In the description of the invention, only these two modes are considered for concision though the invention works with additional arbitrary locking modes. Hence, for the remainder of the description, a lock state is made up of two owner sets: a read owner set and a write owner set.

EXAMPLE 1

Figure 3:
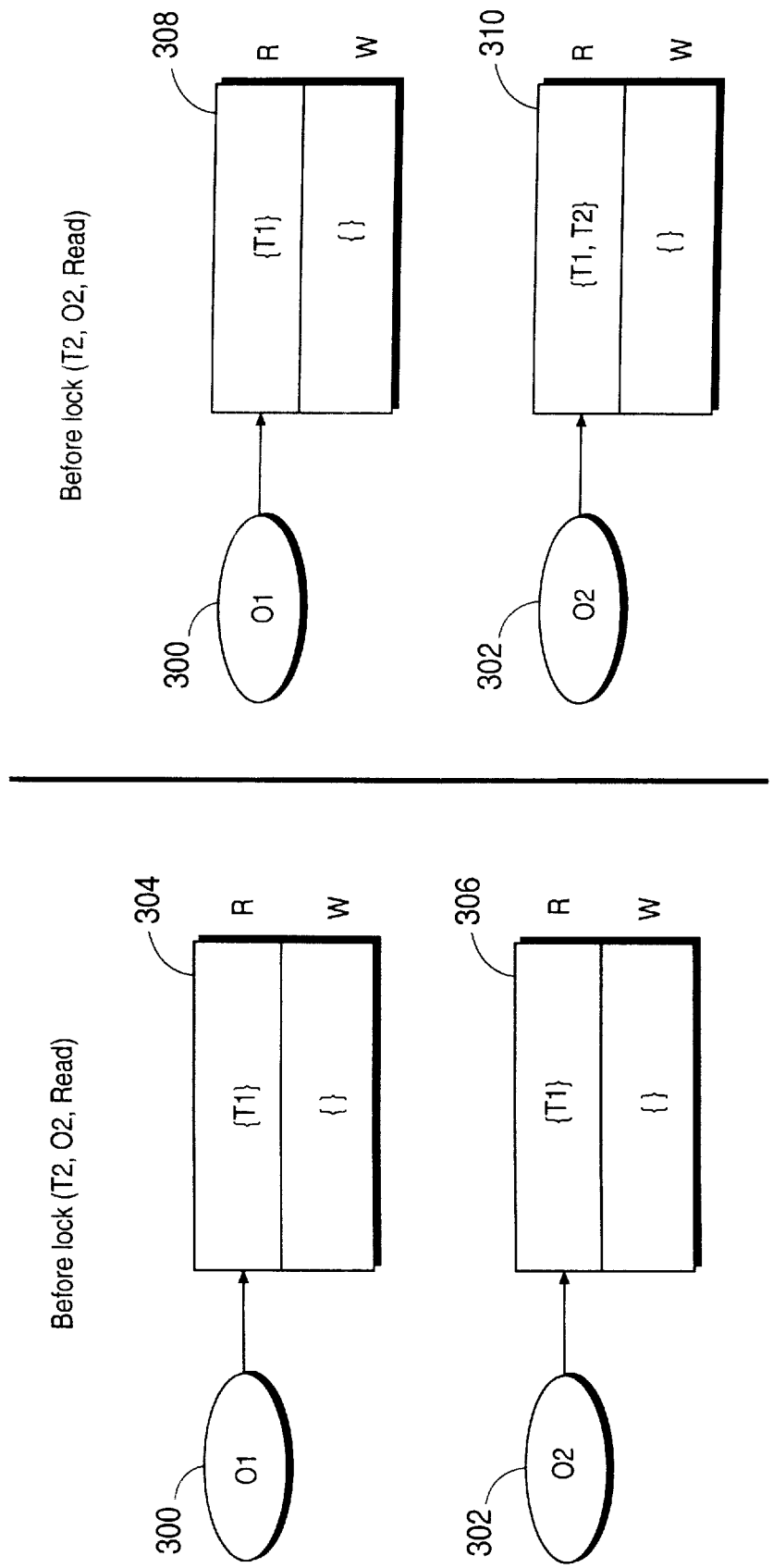
FIG. 3 demonstrates the locks in a traditional protocol before and after a transaction acquires a lock.
Figure 4:
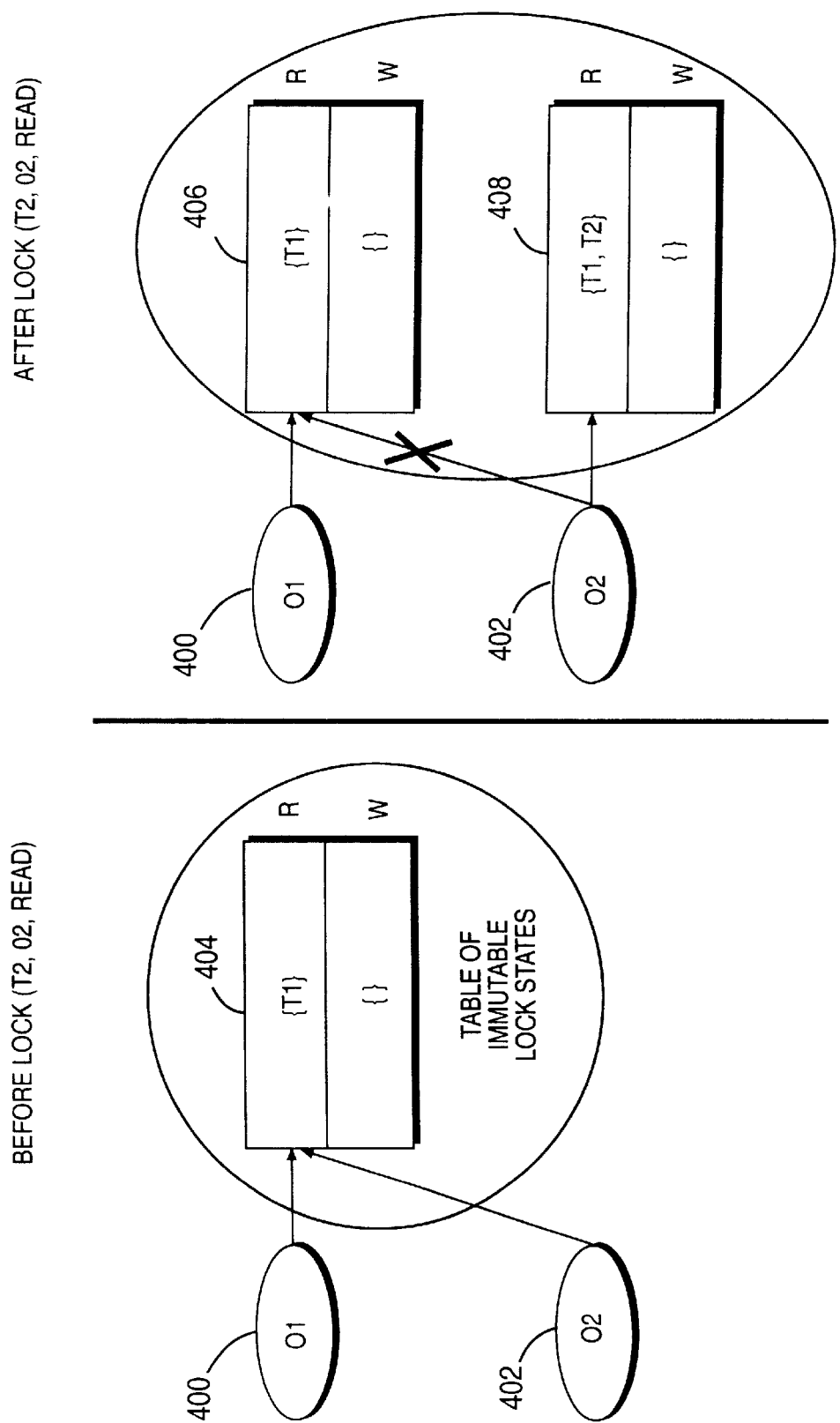
FIG. 4 demonstrates sharing of lock states before and after a transaction acquires a lock.

FIG. 4 demonstrates the scenario described above with respect to FIG. 3 using lock states instead of locks. Two resources, $O_1$ 400 and $O_2$ 402 have been read by a transaction $T_1$, and $O_2$ 402 is about to be read by $T_2$. Before the read by $T_2$, FIG. 4 demonstrates that both $O_1$ 400 and $O_2$ 402 are read by transaction $T_1$ and thus have the same lock state 404, a set consisting of $T_1$ for a read mode. After $T_2$ has performed a read of $O_2$ 402, both resources $O_1$ 400 and $O_2$ 402 share the same lock state which corresponds to the state each data structure representing their respective lock would be in. The acquisition of $O_2$'s lock by $T_2$ changes $O_2$'s lock state association 404 to a new lock state 408. Since that new lock state does not exist yet in the TILS, a lock state 408 with an empty write owner set and a read owner set made of $T_1$ and $T_2$ is created as the result of the lock operation on $O_2$ 402. Comparing FIGS. 3 and 4, before the execution of $T_2$, FIG. 3 demonstrates the use of two locks 304 and 306, compared to the one lock state 404 of FIG. 4. After the execution of $T_2$, FIG. 3 demonstrates two locks 308 and 310 (that are the same locks as locks 304 and 306 respectively), and FIG. 4 demonstrates two lock states 406 (the same lock state as lock state 404) and 408. The next time a resource's lock changes to the same state, for instance, if $T_2$ acquires a read lock on $O_1$ 400, the lock state will already be available.

EXAMPLE 2

Figure 5:
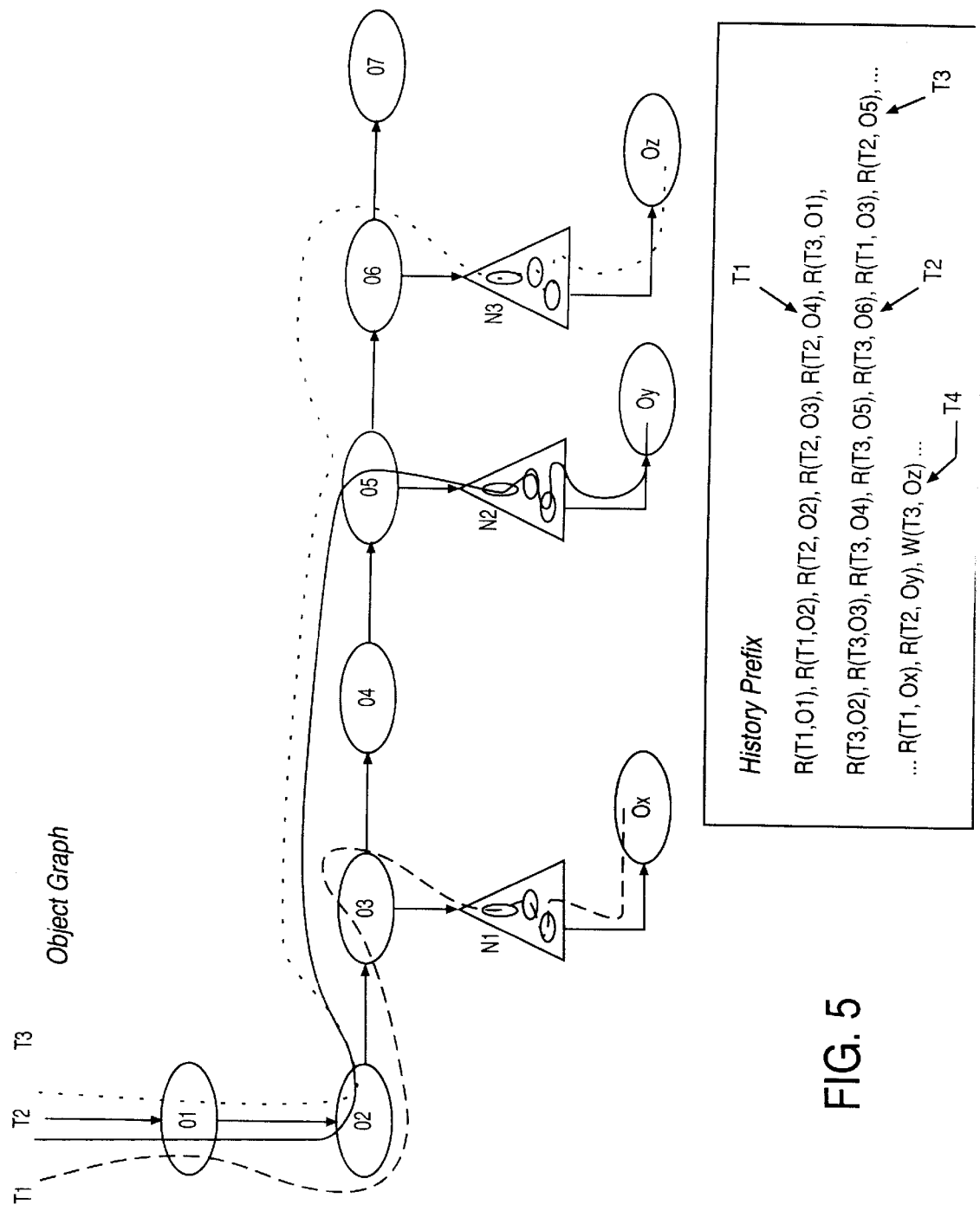
FIG. 5 illustrates the access path of three transactions through a graph of resources and a history of operations that corresponds to one possible execution of the three transactions traversing this graph.

FIG. 5 demonstrates the flow of several transactions T1–T3 through various resource objects $O_1$-$O_2$ (the object graph). Triangles rooted at resource objects $O_3$, $O_5$ and $O_6$ represent sub-graphs containing, respectively, $N_1$, $N_2$ and $N_3$ resource objects.

A history of a possible execution of three transactions, $T_1$, $T_2$ and $T_3$, that traverse different overlapping portions of the graph is shown as the history prefix of FIG. 5. A curved line corresponding to each transaction shows the path followed through the object graph by each transaction.

Figure 6:
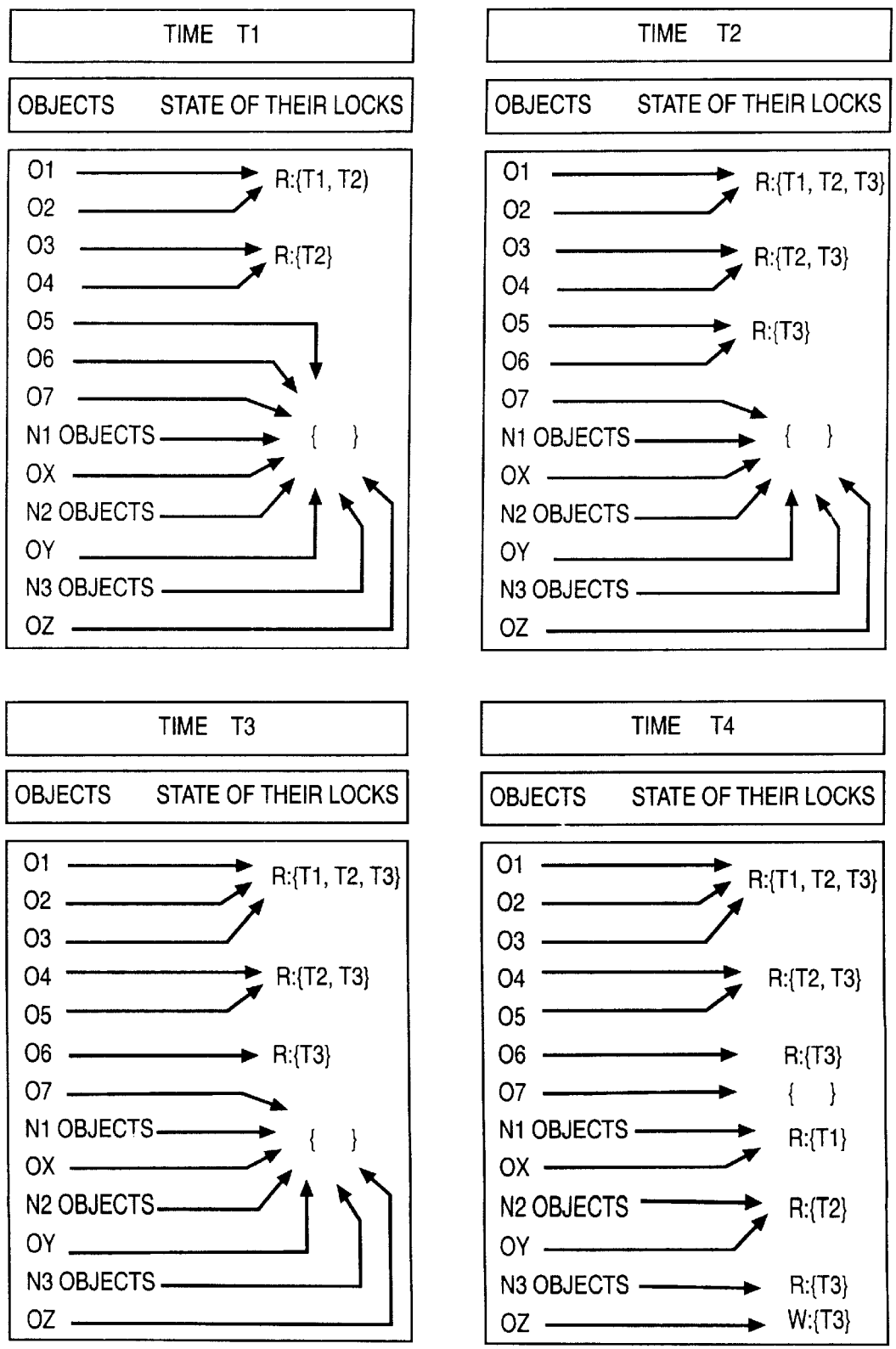
FIG. 6 demonstrates the sharing of lock states of the resources of FIG. 5 at four time intervals.

FIG. 6 demonstrates the state of each object lock of FIG. 5 at four different times in the history ($t_1$, $t_2$, $t_3$, and $t_4$). Only the non empty owner sets of the state of each lock is shown. Each owner set shown is tagged with a letter that indicates the corresponding locking mode: R for read mode and W for write mode.

At time $t_1$, the states of $O_1$'s lock and $O_2$'s lock are identical, as are the state of $O_3$'s and $O_4$'s locks as indicated by $O_1$ and $O_2$ pointing to the same lock state and $O_3$ and $O_4$ pointing to the same lock state. All other objects have their lock in an unlocked state, i.e., all the owner sets of these locks are empty, and thus point to the same lock state.

Conceptually, objects that are not manipulated by any transactions are given an empty lock, though in one embodiment, no lock is allocated for such objects. Instead, locks are allocated on demand whenever a lock request is issued for an unlocked object. The object is then dynamically associated with that lock. The lock data structure is freed when the object it protects is unlocked. In the following, we will omit unlocked states when discussing space overhead but for clarity, we have represented them in FIG. 6.

TABLE 1

Number of locks vs. number of lock states

| time | # of locks | # of lock states |
|------|------------|------------------|
| t1 | 4 | 2 |
| t2 | 6 | 3 |
| t3 | 6 | 3 |
| t4 | 9 + N1 + N2 + N3 | 6 |

Table 1 reports for each given time in the history of FIG. 6 the number of locks and the number of lock states. From this table, one can see that on average, based on the history prefix, the number of lock states is at worse 50% smaller than the total number of locks (assuming $N_1$, $N_2$, $N_3$ are all greater or equal to 1). The total number of lock states can be as small as 1, (e.g., when the working sets of all active transactions overlap exactly). However, when the working sets of transactions don't overlap at all, the number of lock states is the number of active transactions.

Assuming that no constraint exists to define what combination is a valid lock state, and that conflicts never happen, the maximum number of possible lock states may be computed as follows: Let T(t) be the set of active transactions at time t. The value of an owner set can be any subset of T(t). Thus, the number of possible values for one owner set is the cardinality of p(T(t)), the power set of T(t), which has cardinality $|p(T(t))|=2^{|T(t)|}$. Assuming M different locking modes, the total number of possible lock states is $(2^{|T(t)|})^M = 2^{M|T(t)|}$. With M=2 and 10 active transactions, there are approximately 1 million possible states for a lock.

In a transaction processing system, two factors may reduce the number of lock states:
1. Constraints imposed by the transaction model on what constitutes a valid lock state: transaction models prevent some lock states from ever happening since they correspond to situations the locking protocol prevents from happening (e.g., two owners in exclusive mode).
2. The regularity of data structures and algorithms prevents some lock states from ever happening.

As an example, let us assume the ACID transaction model (a system that utilizes transactions that maintain atomicity, consistency, isolation, and durability (ACID)) with the two locking modes, re ad and write. This model prevents any lock states with more than one transaction in the owner sets corresponding to the exclusive mode (the isolation property). Thus, a valid lock state has either its write owner set empty, or its read owner set empty and a singleton as a write owner set. If such a model is used, then, the total number of possible lock states is the sum of:

$2^{|T(t)|}$, the number of lock states corresponding to locks granted in read mode only, and $|T(t)|$, the number of lock states corresponding to locks granted in write mode only, that is, $2^{|T(t)|}+|T(t)|$.

As described, the total number of lock states cannot exceed the total number of locks, should each existing lock be in a distinct state.

Lock Operation

A general description of lock states is set forth above. The detailed operation of locks including the acquisition and release of locks according to one embodiment of the invention are described below.

Lock Acquisition

Figure 7:
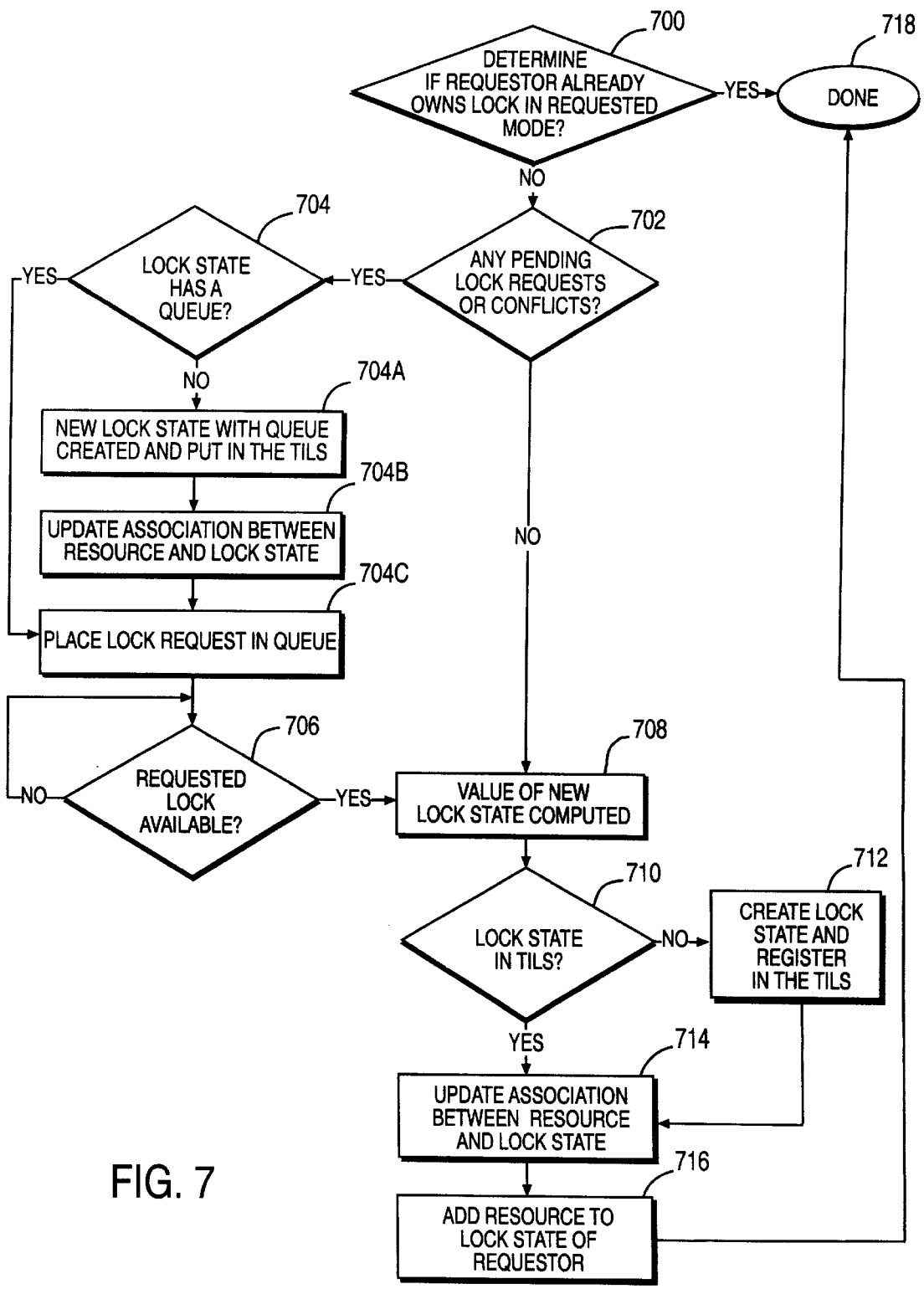
FIG. 7 illustrates the lock acquisition process according to one embodiment of the invention.

FIG. 7 illustrates the lock acquisition process according to one embodiment of the invention. At step 700, the lock manager determines if the transaction requesting the lock already owns the lock in the requested mode. If the transaction already owns the lock in the requested mode, then there is no change in the lock state and processing continues at step 718.

If the transaction does not own the requested lock, the lock manager checks for any conflicts with the existing locks and for the absence of any pending lock requests (by other transactions) at step 702. If there is a conflict but no pending lock request (determined at step 704), a new lock state with a queue is created and entered in the TILS at step 704.a. This new lock state differs only from the previous lock state that caused the conflict by the addition of a queue of pending requests. The association between the requested resource and a lock state is updated accordingly at step 704.b, and the lock request is added to the queue at step 704.c. If a queue was located for the lock state (at step 704), the lock manager adds the request to the queue at step 704.c. In one embodiment, the queue is processed in first-in-first-out (FIFO) order. At step 706, the lock manager waits for the requested lock to become available. In one embodiment, a lock may become available when the conflict is cleared (e.g., when the lock is released by another transaction) and when transactions that were ahead of the current requestor in the queue have been processed.

Once all conflicts have been cleared and the lock manager determines that the current transaction may be granted the desired lock, the value of the new lock state is determined at step 708. The new lock state value is determined by adding the transaction that is granted the lock to the owner set corresponding to the requested lock mode. This new lock state value (stored in a temporary variable) is used as a key to lookup if a corresponding immutable lock state value has already been registered in the TILS at step 710. If such a lock state does not exist in the TILS, a new one is created with this value and registered in the TILS and returned at step 712. At step 714, the association between the resource and the lock state representing its lock is then updated to refer to the lock state retrieved (at step 710) or created (at step 712).

At step 716, the resource is added to the set of locks (referred to as lock set) owned by the requestor.

The above steps are further illustrated by the following pseudo code:

1 acquire_lock(Resource R, LockingMode M, Transaction T)
2 begin
3 LockState $l_1 \leftarrow$ lock (R);
4 if (T $\in$ Owner(l,M))
5 return GRANTED
6 endif
7 if (Q(l)=0 $\vee$ IOwner(l,M) $\nsubseteq$ {TT})
8 /* wait case */
9 endif
10 LockState $l_2 \leftarrow$ l
11 Owner($l_2$,M)$\leftarrow$Owner($l_2$,M)$\cup${T}
12 lock(R)$\leftarrow$TILS.lookup($l_2$)
13 lockset(T)$\leftarrow$lockset(T)$\cup${R}
14 return GRANTED
15 end In the above pseudo code, the state of a lock is comprised of one owner set per locking mode. Owner (1, M) is defined as the owner set of lock 1 that corresponds to the locking mode M. Each owner set records the transactions that were granted the lock in the corresponding mode. When considering only read and write locking modes, a lock state is a pair <Owner (1, Read), Owner (l,Write)>. The state of locks with pending lo requests due to a conflict(s) is augmented with a set Q(l) of pairs <T, M>, wi T is the suspended transaction, and M is the mode requested by T.

In one embodiment of the invention, a compatibility matrix defin the compatibility between locking modes. This matrix can be represented function Compatible ($M_1$, $M_2$) that states whether a mode $M_1$ is compatit with $M_2$. Using the compatibility matrix, IOwner (l, M) is defined as the transactions that own lock 1 in a mode incompatible (I) with mode M. T set is defined as:

$$IOwner(l, M) = \bigcup_{\forall M_1 | \neg Compatible(M, M_1)} Owner(l, M_1)$$

For instance, IOwner(l,Write)=Owner(l,Write)$\cup$ Owner(l, Read). This equation illustrates that if a write lock exists, the set of incompatible owners consists of the owners of other write locks and read locks (since a read and write lock on the same resource are incompatible with each other).

The absence of a conflict between a request for a lock 1 in a mode M by a transaction T and the state of 1 is given by:

$$IOwner(l,M) \subset \{T\}$$

In other words, if the above condition is complied with, then the lock can be granted.

In addition to updating the lock states as described above, the lock manager records, for each transaction T, the locks that have been granted to T in order to release the granted locks upon T's completion (irrespective of how T completes). However, since locks have no material existence, in one embodiment they cannot be recorded and the transactions themselves keep track of the resources they have a lock on. Releasing a lock on a resource R operates as a change of the association between R and the lock state that embodies R's lock. As described above, lock (R) is defined as the lock state associated to resource R, and lockset (T) is defined as the set of resources for which transaction T has acquired a lock. Lockset (T) is referred to as the lock set of the transaction T. The lock set of a transaction is defined as:

$$lockset(T)=\{R|\forall M, \forall l:lock(R)=l \wedge T \in Owner(l,M)\}$$

Lock Release

To release a lock, the lock state of the resource being unlocked must be updated and the resource must be removed from the lock set of the transaction that is releasing the lock. This lock release process is illustrated in FIG. 8 and the following pseudo code according to one embodiment of the invention:

1 release_lock(Resource R, Transaction T)
2 begin
3 LockState $l_1 \leftarrow$ lock(R);
4 LockState $l_2 \leftarrow$ l

```
 5  for each M
 6    if T ∈ Owner(l₂,M)
 7      Owner(l₂,M)←Owner(l₂,M)⊖{T}
 8    endif
 9  endfor
10  lock(R)←TILS.lookup(l₂)
11  lockset(T)←lockset(T) ⊖{R}
12  if (Q(l)=∅)
13    return
14  endif
15  /* process waiting queue here */
16 end
```

Figure 8:
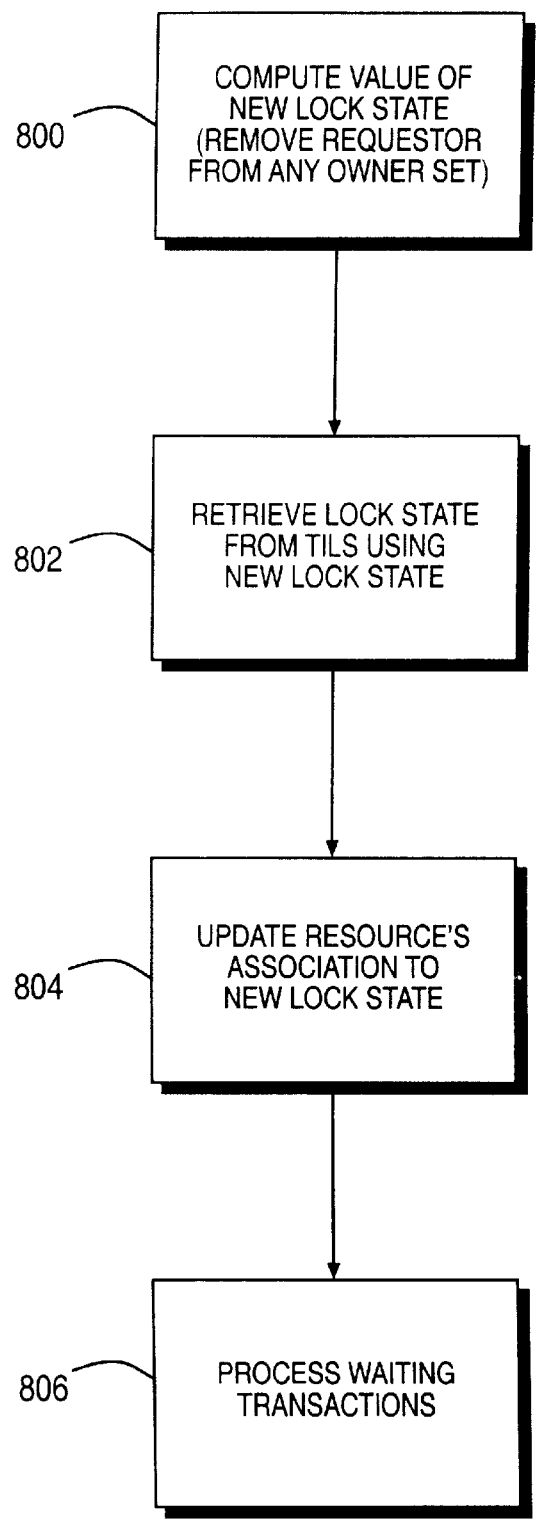
FIG. 8 illustrates the lock release process according to one embodiment of the invention.

Referring to step 800 of FIG. 8, the value of the new lock state that the resource will be associated with is computed. The new value is obtained by removing the transaction from any owner set of the lock state where it appears in. Referring to the pseudo code, to obtain the new value, the current value of the lock state is obtained and copied into a local variable (lines 3–4). The new value is obtained by removing the transaction from the owner sets (of the lock states indicated in the local variable) (lines 5–9 of the pseudo code). At step 802 and line 10 of the pseudo code, the new lock state is obtained from the TILS. At step 804 and line 11, the resource's association with the TILS is updated to reflect the retrieved lock state. Transactions waiting in the queue for the lock release are then processed at step 806 and line 15 of the pseudocode. These waiting transactions will resume at step 708 of FIG. 7.

Lock Set Elimination

As described above, each transaction maintains a lock set containing the locks that each transaction has acquired. In one embodiment of the invention, transactions don't keep track of the resources they have locked and the lock manager does not maintain any lock sets. In such an embodiment, lock acquisition proceeds as described above without the addition or modification of a lock set.

Figure 9:
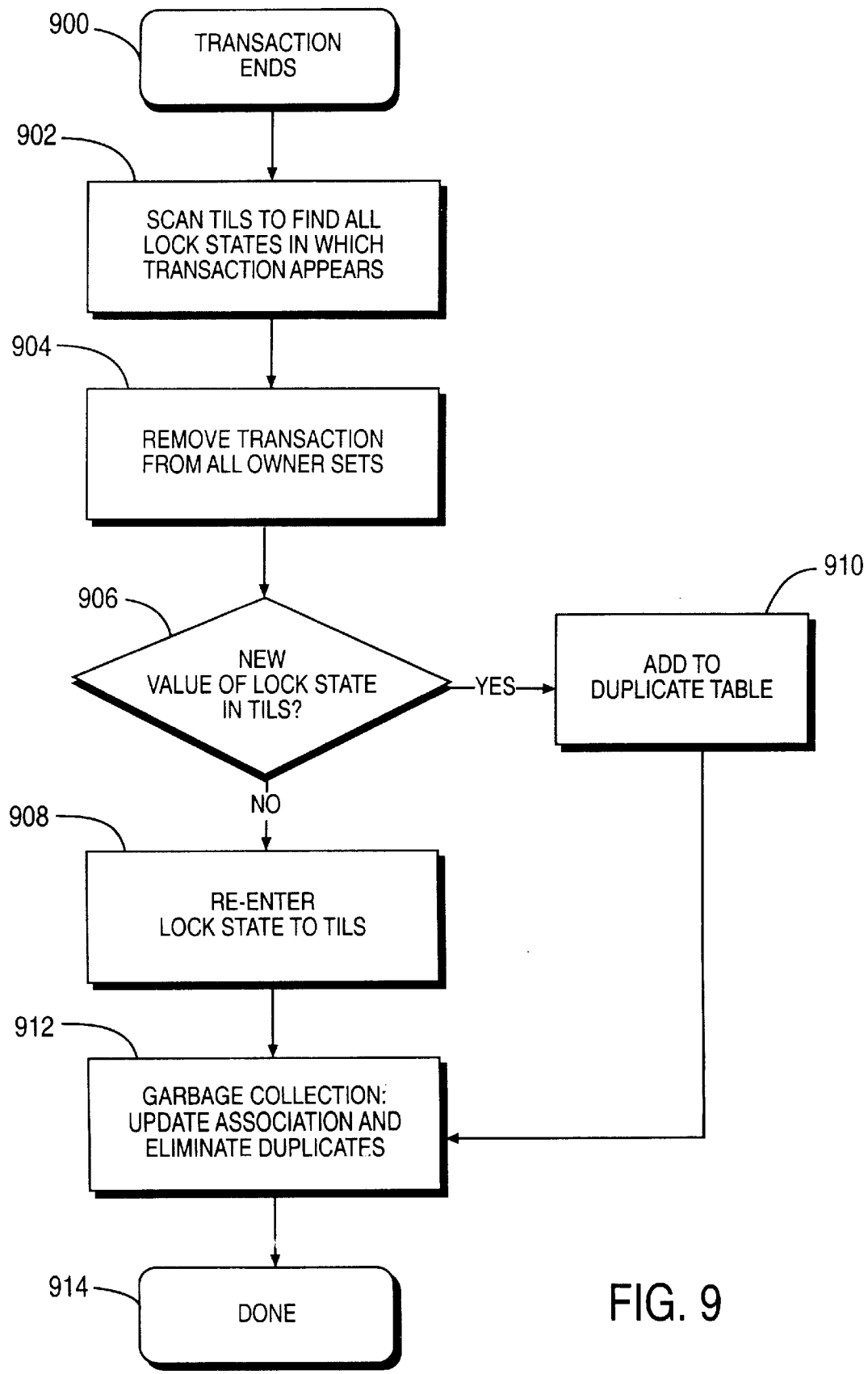
FIG. 9 illustrates the lock release process without using lock sets according to one embodiment of the invention.

FIG. 9 demonstrates the release of a lock without using lock sets. At step 900 the transaction ends. At step 902, the TILS is scanned to find all of the lock states in which the transaction appears. At step 904, for each lock state found, the transaction is removed from all owner sets where it appears. By removing the transaction from the owner set, the value of the lock state is modified. Since TILS's keys are based on the value of a lock state, this modification necessitates reentry in the TILS as a new lock state. At step 906, a determination is made regarding whether the TILS already has a lock state with a value equal to that of the modified lock state. If so, the modified lock state is not re-entered in the TILS but put instead in a duplicate table at step 910. The associations between the resources and the lock states that are updated after a lock release do not need to be changed (the lock state of the association may now belong to the duplicate table). If the modified lock state is not in the TILS, it is registered to the TILS at step 908. Processing then continues. Eventually, garbage collection is initiated (which may be asynchronous) at step 912. During garbage collection, the duplicates in the duplicate table are removed and the associations with the TILS are updated.

Figure 10:
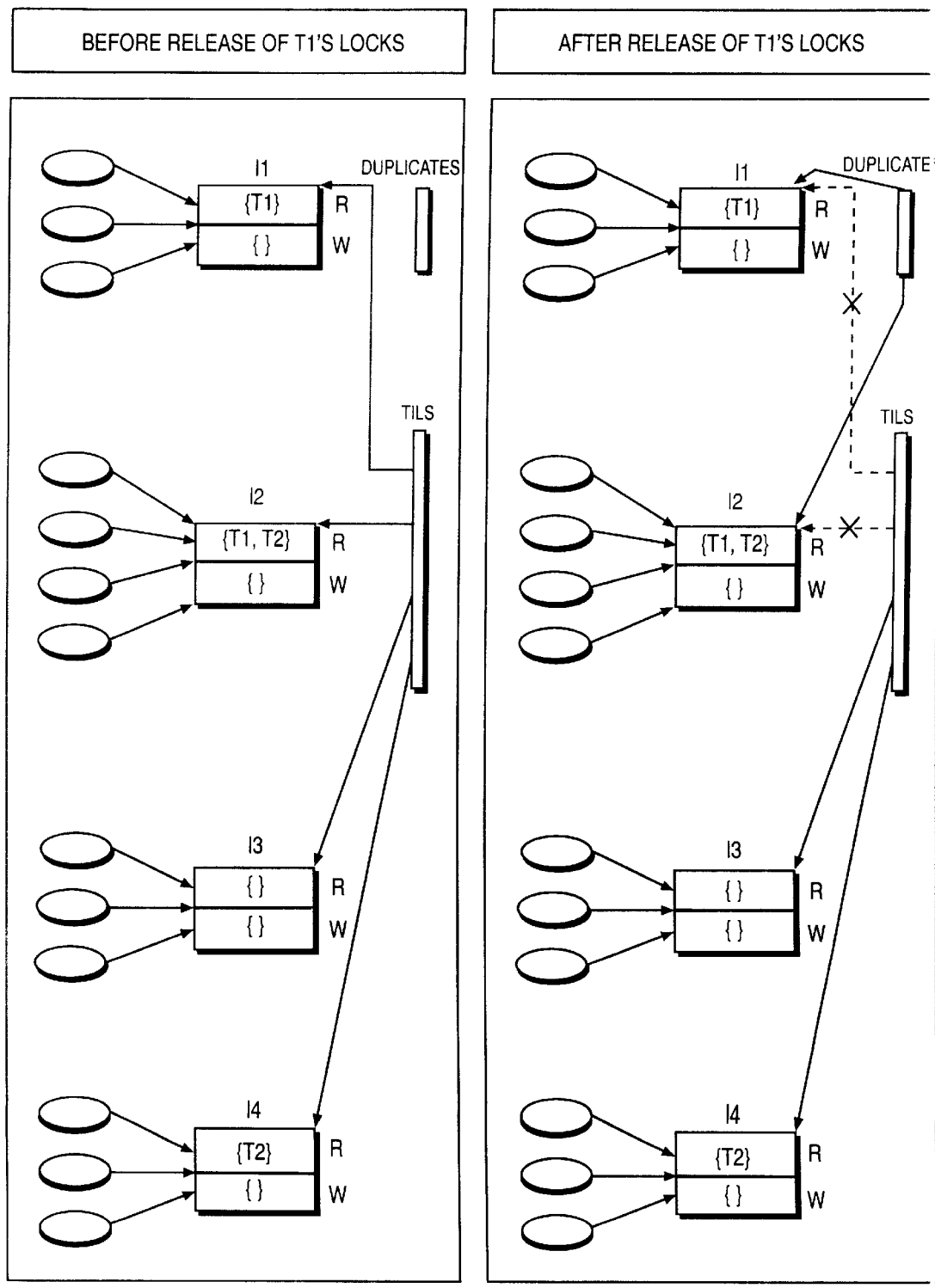
FIG. 10 demonstrates lock states and the TILS and Duplicates table when lock management is used without lock sets according to one embodiment of the invention.

Using the above lock release method, the table of duplicates are updated in addition to the TILS when other transactions release their locks. FIG. 10 demonstrates lock release without lock sets. The Figure shows resources (small circles) and the lock states that represent their lock. Before the end of transaction $T_1$, there are two lock states that represent locks owned by $T_1$ (lock states $l_1$ and $l_2$). When $T_1$ completes, it is taken out of the owner sets of these two lock states. However, the new updated value of these lock states is already represented in the TILS, so these lock states will remain out of the TILS and will not be used for updating the association of a resource upon a lock operation. After release of $T_1$'s locks, $l_1$ duplicates $l_3$, and $l_2$ duplicates $l_4$. The duplicates must be recorded in a table of duplicates in order to update them too when other transactions subsequently release their locks. For instance, after $T_1$'s termination, both the TILS and the table of duplicates contains lock states that represent locks owned by $T_2$. When $T_2$ terminates and releases its locks, it will create two additional duplicates of the "unlocked" lock state (i.e., $l_3$): $l_4$ will turn into a duplicate of $l_3$ and will be taken out of the TILS and recorded in the table of duplicates, and $l_2$ will also turn into another duplicate of $l_3$ but no table management will be necessary since $l_2$ is already in the table of duplicates.

Implementation of Lock Manager

In one embodiment of the invention, lock owner sets are represented as bitmaps. A bitmap is an array of binary digits (either a 1 or 0 in the binary number system; also referred to as bits). Additionally, each transaction is assigned a locking context that uniquely identifies the transaction.

Figure 11:
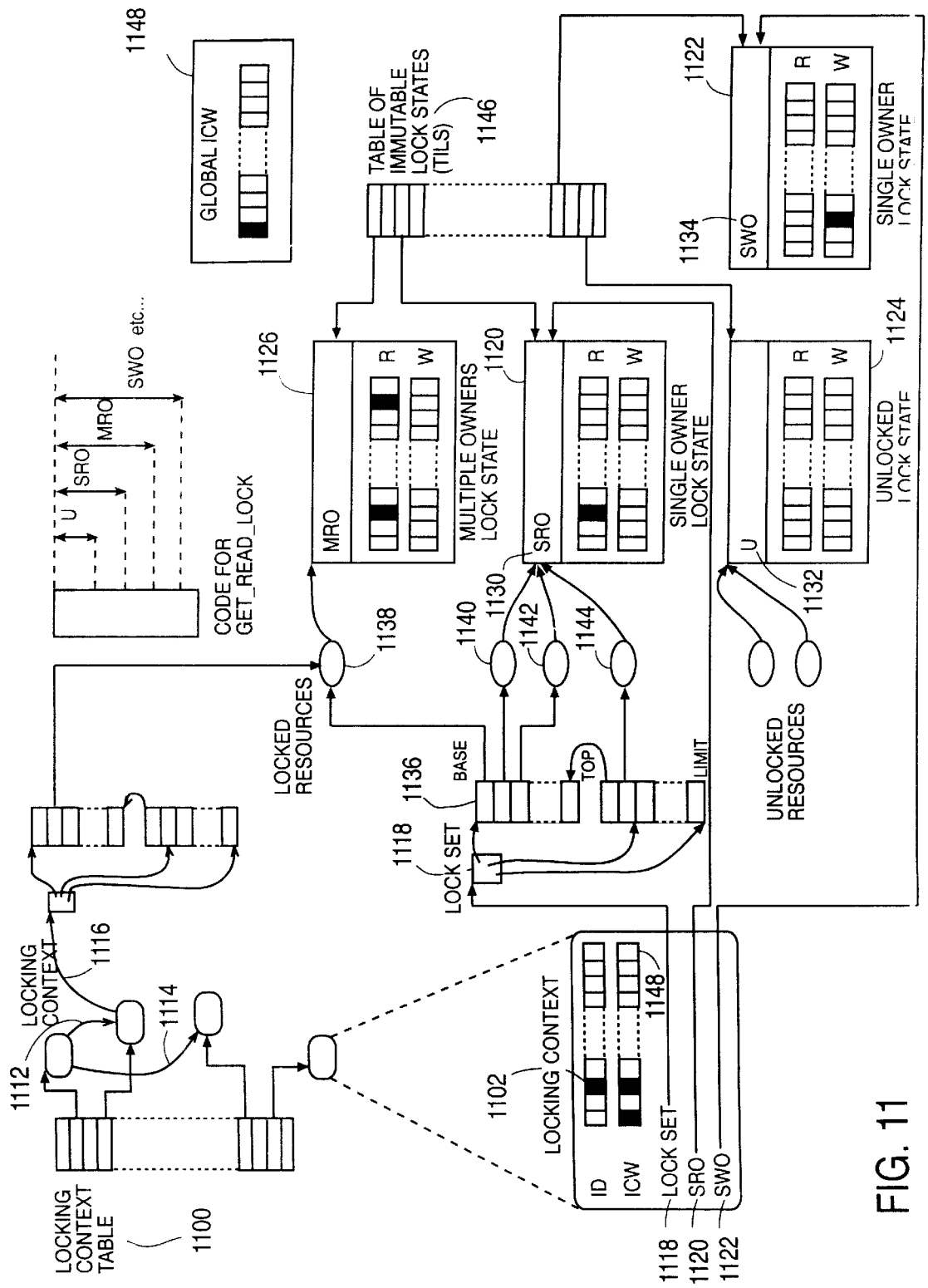
FIG. 11 demonstrates the lock manager s data structures according to one embodiment of the invention.

Bitmaps are used to map specific bits to a locking context. All bitmaps use the same mapping from locking contexts to bit numbers, i.e. the $i^{th}$ bit always represents the same locking context. Bits that are set to 1 in a bitmap indicate the membership of the owner set that the bitmap represents. FIG. 11 illustrates an overview of the data structure of the lock manager and will be discussed below.

Locking Context

Transactions request services to the lock manager using their locking context. A locking context is associated with a unique bit number (in a bitmap) that identifies it, and so its transaction, within the lock manager.

Referring to FIG. 11, a locking context is comprised of the following.

(1) The bit number 1102 that currently identifies it. This number is also an index to a table of locking contexts 1100. When changing the locking context's identifier (i.e., its bit number), the locking context location in the locking context table is changed accordingly.

(2) Links to other locking contexts 1112–1116.

(3) A lock set 1118. The present description assumes a variant of the lock manager than maintains lock sets to keep track of locks acquired by transactions. If lock sets are not utilized (as described above), the lock set reference in the locking context may be eliminated.

(4) References to specific exclusive lock states 1122 that were solely acquired using the present locking context (referred to as single-owner lock states). There is one single-owner lock state per locking mode. Single-owner lock states are used to avoid looking up the lock state in the TILS when acquiring a lock on an unlocked resource. With two lock modes, each locking context maintains two single-owner lock states, called single-read owner (SRO) 1120 and single-write owner (SWO) 1122.

As described above, the reference to an SRO 1120 or SWO 1122 is present to denote a lock state for the one transaction identified by the locking context. Thus, if a resource has no associated locks (i.e., it is unlocked), the reference in the locking context may be utilized instead of looking up the lock state in the TILS.

Lock States

Each lock state 1120–1126 is made of a header 1128–1134 that contains information, such as a type tag (type tags are discussed in detail below) and other extra data used for the maintenance of the TILS. Each lock state also contains an array of bitmaps, each bitmap representing an owner set for a given locking mode. When only read and write locking modes are used, a lock state contains two such bitmaps only (a Read bitmap and a Write bitmap).

Lock Set

A lock set 1118 identifies the locks that a current transaction owns. In one embodiment lock sets are maintained in a linked list. A linked list is a list of elements (e.g., a reference to a resource) and a link pointing to another element.

Figure 12:
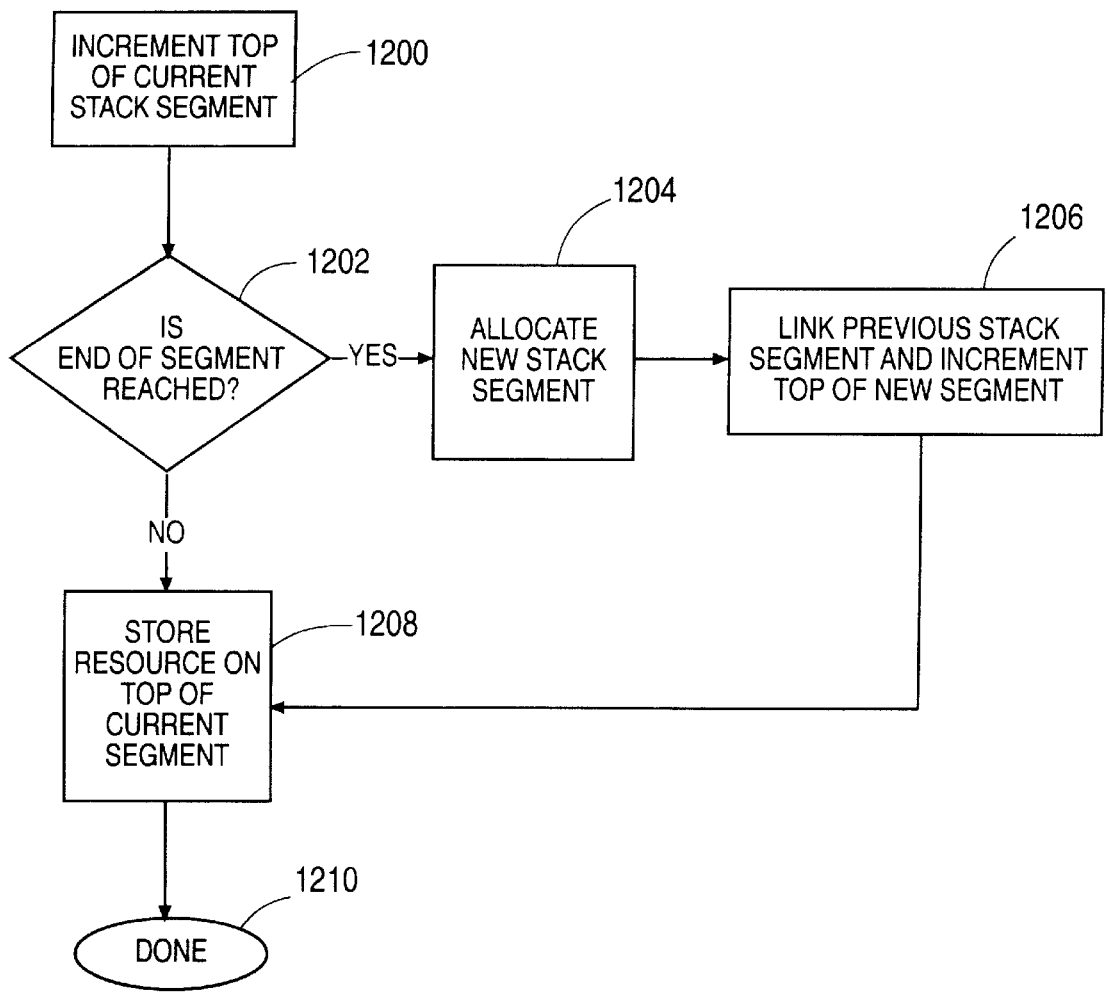
FIG. 12 illustrates the use of a stack for a lock set according to one embodiment of the invention.

In another embodiment, lock sets are implemented as segmented stacks of references to resources. A stack is a data structure such that information added or pushed onto the stack is the last to be moved or popped off of the stack (referred to as First-In-Last-Out or FILO). In one embodiment, each element pushed onto the lock set stack 1136 is comprised of a reference to a resource 1138–1144. When a transaction acquires a new lock, the resource must be added to the stack 1136. FIG. 12 demonstrates the addition of a resource to a lock set. At step 1200, the top of the current stack segment is incremented, and at step 1202 a boundary check is conducted to determine whether the end of the current segment is reached (i.e., whether there is enough room in the current segment to add the resource's reference). If the check succeeds (i.e., there is enough room), the reference to the resource is stored on top of the stack (at the location where the stack pointer points) at step 1208. Otherwise, a new segment is allocated at step 1204. At step 1206, the first location of the new segment is used to link to the previous current segment of the stack, and the new segment becomes the new current segment. The top of the stack is then incremented at step 1206 and the reference of the resource is put at that location at step 1208.

When a transaction is complete, each element of the stack (which contains a reference to a resource) is popped off of the stack and the associated resource is unlocked. Each element is popped off of the stack in this manner until the transaction's stack is empty.

Table of Immutable Lock States (TILS)

The lock manager maintains an associative table of immutable lock states 1146, the TILS. In one embodiment, the TILS can be implemented as a hash table. A hash table is a table of information that is indexed by a unique number (referred to as a hash code) that is obtained by a hash function. A hash function takes known information as input, and numerically manipulates the information to produce the hash code as output. In one embodiment, the input for the hash function consists of the lock state information (e.g., the bitmaps of each lock state).

Lock Manager Execution

The lock manager cooperates with a resource manager (a utility that manages all resources) to initialize associations between resources and lock states, and to garbage collect unused lock states. Unlocked resources are associated with a lock state that represents the unlocked state. In one embodiment, upon encountering an unlocked object or resource, a direct pointer to the "unlocked" lock state is stored in the object.

Locking Operations

In one embodiment, locking operations may make use of two techniques to improve performance: dispatching to specialized code according to lock state type, and non-blocking synchronizations.

Dispatch to Specialized Code

Dispatching to specialized code comprises executing specific or specialized code depending on the type of lock state encountered. The lock manager assigns to each lock state a type that corresponds to one of the six following categories:

1. unlocked (U): the lock state type that represents the lock of an unlocked resource. There is only one lock state of this type.
2. single read owner (SRO): the lock state type that represents ownership by a single owner in read mode only. There is one lock state of this type per active transaction.
3. single write owner (SRO): the lock state type that represents ownership by a single owner in write mode. There is one lock state of this type per active transaction.
4. multiple read owner (MRO): the lock state type that represents ownership by multiple owners in read mode only.
5. multiple write owner (MWO): the lock state type that represents ownership by multiple owners in write mode. Lock states in this category exist only when conflicts with other transactions are ignored.
6. non-empty queue (Q): the lock state type that represents a lock with a non empty set of pending lock requests, irrespective of the value of the lock's owner sets.

The type of a lock state is assigned at the time the lock state is created. The type indicates the data structure and representation of the lock states. For instance, lock states of type Q have additional data structures related to the management of the pending queue of waiting lock requests, that lock states of any other types do not have.

The type also determines the implementation of each locking operation that may be used. In other words, the type specifies the implementation of the locking operation for that lock state (e.g., lock acquisition or lock release). The implementations of the operations are stored in memory with a specific starting point and ending point. It is possible to jump to a certain location within the memory by specifying an offset (a number that tells how far from a starting point a particular item is located). Thus, the type specifies the desired implementation by storing a vector (a variable that has both distance and direction) of offsets, with one offset per locking operation (e.g., lock acquisitions and release).

By storing the offset, a locking operation Op on a resource R may use a specific implementation of the lock operation. The locking operation uses the desired implementation by loading the offset corresponding to Op from the type of the lock state currently associated with R. The lock manager then dispatches the execution of the locking operation Op to additional code that specializes in handling lock states of that type. The lock manager dispatches the execution by adding the offset from the Op type to Op's starting point (referred to as a base address) and jumping to the resulting location.

The code for this dispatching mechanism, in the case of a read lock acquisition, is shown on the first six lines of the code illustrated in FIG. 13. The code for dispatching according to a lock state's type takes 3 instructions (lines 2, 4 and 5 of FIG. 13). By dispatching the execution of the locking operation in this manner (i.e., using offsets and jumping to the appropriate location), there is no need to use conditions at the beginning of each specialized code sequence to determine whether the specialized code is the appropriate code. For example, if the lock state type is "unlocked", then there is no need to find out in what mode the lock is owned, or testing for ownership, or to do conflict detection. All that is required is to change the resource's lock state for the lock state corresponding to a single ownership by the current transaction.

The number of lock state types may be extended to allow for varying bitmap sizes, and to dispatch operations to code specialized in handling bitmaps made of a single word, or two words or an arbitrary number of words. (The size of a word in this context is the size of one machine register, either 32 bits or 64 bits on more recent 64-bit processors such as the UltraSparc™. The space consumed by each lock state is adjusted to the minimal number of words required to represent the owner sets of that lock state. For instance, if a transaction whose locking context is assigned a bit number smaller than 63 executes a locking operation on a lock state made of 64-bit bitmaps, the dispatching mechanism would jump to a version of the code that requires only one 64-bit register (a register is a named region in memory that is required and used to hold information during the execution of instructions) per bitmap to execute set operations.

Non-blocking Synchronizations

In one embodiment, lock state sharing enables the usage of non-blocking synchronizations to change the lock state of a resource. A non-blocking synchronization requires an implementation using an atomic compare and swap operation (such as the cas instruction of the Sparc V9 processor, or the cmpxchg instruction of the Intel486 and Pentium family of processors).

FIG. 13 shows how non-blocking synchronizations are used on a case of lock acquisition, namely, read lock acquisition on an unlocked resource. A lock operation starts by reading the lock state associated with a resource (line 3). The header of the resource's lock state is used to dispatch to the execution code specialized for handling that type of lock state. Assuming the lock state was of type "unlocked", the lock manager then jumps to the code starting at line 7. Since the lock state associated with the resource was found to be the "unlocked" state, the lock manager uses the SRO lock state of the caller's locking context as the new lock state for that resource (the SRO is pre-loaded on line 6). The cas instruction is then used to test if the resource's lock state is the "unlocked" lock state and to swap it with the locking context's SRO if it is the case. If the compare-and-swap fails (given by a test at line 9), it means that at least one other transaction has managed to set its own lock while the transaction was executing instructions at lines 3 to 8. The lock manager must then retry the lock acquisition with the new lock state (lines 13 and 14 initiate the retry and jump to line 4 to re-dispatch to specialized code best suited to handle the type of the new lock state returned by the compare-and-swap instructions). Otherwise, if the compare-and-swap succeeds, the lock manager completes the lock acquisition by recording the locked resource in its lock set.

In the more general case of lock acquisition, such as when the current lock state is of type MRO or MWO, the lock manager performs ownership testing on the lock state first. If the test succeeds, nothing needs to be done because even if a lock state transition is performed by a concurrent transaction, it will not remove the ownership of the lock for this transaction.

If the ownership test fails, conflict detection may be required, depending on the type of the locking mode requested and the type of the lock state (e.g., conflict detection is not required for a read-lock request on a MRO lock state). If the request can be granted, a new lock state value is built and used to retrieve the corresponding lock state from the TILS. The resource's lock state is then changed using the cas instruction in a similar way to that described earlier. If the cas instruction fails to swap the two lock states, the lock manager retries the operation with the more recent lock state returned by the cas instruction.

If a conflict is detected, a new lock state of type Q is created and the cas instruction is used again to install it. In one embodiment, to guarantee that scheduling decisions are taken in an indivisible manner, all operations on a lock state of type Q are required to take a latch on the lock state to manipulate the queue of pending request.

Conflict Detection

Before granting a lock to a transaction, a determination is made as to whether the granting of the lock would conflict with an existing lock. A conflict may arise when a transaction owns an exclusive type of lock (e.g., a SWO), for example. Conflict detection may occur by viewing the type of lock that is held by a resource (which is stored in the lock state).

In one embodiment, upon completion of a transaction T, instead of releasing T's locks and updating associations between all of the resources locked by T and their lock states, the transaction T notifies each active transaction AT that it no longer conflicts with AT. Thus, when an AT has a conflict with a resource's lock because of a terminated transaction T that didn't change the lock states representing its locks, AT can ignore the conflict with T. Referring to FIG. 11, for this to work, the lock manager maintains in a global variable a set ICW 1148 of ignore-conflict-with transactions. When a transaction T completes, all it has to do is add its bit number in the global ICW set 1148.

In addition to the above, each locking context maintains its private copy of the set ICW 1148, and updates this copy only if a conflict with a lock can't be resolved. This changes conflict detection so that an absence of conflict for a transaction T for a lock 1 in a mode M is given now by:

$$IOwner(l,M) \subseteq T \cup ICW(T)$$

If after the update, the conflict still can't be resolved, it means that the conflict is not due to a terminated transaction and that the lock request must wait until the conflict is clear (as described earlier, and in FIG. 7).

Memory Management

Lock states are data structures and therefore occupy memory. The memory area used for lock states is divided into three spaces: a static space, a from-space and a to-space. The static space is used to hold lock states that are always required, such as the lock state representing the lock of "unlocked" resources, or the single-owner lock states of each locking context. The static space is occupied at the startup of the lock manager. The from-space and to-space are used for memory allocation and garbage collection. Any garbage collection routine may be used. Garbage collection routines accumulate unused objects or memory and free up the space.

The lock manager provides each locking context with a private area of memory for allocating lock states. Lock states are allocated linearly with a private memory area. When an area becomes full, a new area is allocated from the current from-space. Synchronizations are required only around allocation of an area to a locking context.

Garbage collections use the locking contexts of active transactions as roots. When garbage collection completes, the TILS is scanned to remove any references to lock states left in the from-space. The triggering of garbage collections is correlated to the recycling of bit numbers (discussed below).

Recycling of Bit Numbers

To avoid exhaustion of bit numbers (which are used to identify locking contexts), one embodiment of the invention provides for the recycling of inactive bit numbers (inactive bits are discussed below). By recycling inactive bit numbers, the size of the bitmap (and the number of lock states) may be maintained as small as possible. Further, operations may be performed more quickly using a small bitmap compared to operations performed on a large bitmap.

A locking context is active if it is allocated to an active transaction. A lock state may potentially be used as long as all the bit numbers that appear in its owner sets are used by active locking contexts. A bit number is active if it used to identify an active locking context, and inactive if it does not identify an active locking context.

In one embodiment, the recycling of bit numbers is performed during garbage collection. During garbage collection, the garbage collector checks if any owner sets of the lock state (to be copied to another location) contains inactive bit numbers (e.g., bits that mapped to locking contexts of terminated transactions (as described above) that did not delete their bits from the lock states representing the locks these transactions owned upon their completion). If no inactive bit numbers are found, garbage collection proceeds as usual.

If inactive bit numbers are found, a new lock state value is built in a temporary area. This lock state value is obtained by removing all inactive bit numbers (i.e., setting the corresponding bits the owner set bitmaps to 0). Then, the TILS is searched for an existing lock state with that value. If the lookup fails, a new lock state with that value is created in the to-space and acts as the copy of the original lock state. Otherwise, the lock state retrieved from the TILS is promoted to the to-space (if it wasn't already). In both cases, the pointer to original lock state is set to refer to the copy of the equivalent lock state, cleaned from inactive bit numbers. Once garbage collection has completed, inactive bit numbers are removed from any active locking contexts where they appear, and recycled for allocation to incoming transactions.

In one embodiment, garbage collection is triggered when the number of active bit numbers has decreased significantly.

TILS Lookup Elimination

As described above, to access a lock state in the TILS, a lock state value that will be used as a key to retrieve the corresponding immutable lock state must be constructed (through a hash function). The performance of lookups depends highly on the quality of the lock state hashing functions. A poor hash function increases the size of the collision chain (a collision chain contains elements with hashcodes of equal value, i.e, when the hash function takes two different inputs and produces the same output which is supposed to be unique). Long collision chains degrade the performance of TILS lookup because a collision chain may be entirely scanned to determine whether a lock state is in the TILS.

In one embodiment, caching is used. Caching provides for the storage of information in a special location that may be used for quick access by future operations. Caching may store the most frequently used information or the information that was used last. By utilizing caching for lock states, the lock manager is provided with rapid access to frequently used or previously used lock states. If it can be determined that a specific lock state is used or likely to be used, by storing the lock state in cache, a TILS look up may be avoided.

To utilize caching, each locking context is augmented with a lock state transition cache. The lock state transition cache has one entry per type of lock state (e.g., U, SRO, SWO, MRO, MWO, and Q) and per locking operation (e.g., lock acquire or release). Each entry is comprised of the last lock state of each type that was used during a locking operation. Additionally, each entry stores the new lock state resulting from the execution of the locking operation. The last lock state is used for a comparison with the current lock state of a resource (to quickly locate the lock state). The new lock state is used to avoid building a new state and looking up in the TILS.

Cache entries corresponding to SRO and SWO lock states are immutable and used only for acquiring the lock of an unlocked resource (since both SRO and SWO are single owner lock states). Each of these cache entries is comprised of the unlocked lock state and the single-owner lock state corresponding to the transaction this cache belongs to.

The cache of a transaction T for a non-single-owner lock state (e.g., MRO) is solicited if and only if the working set of T overlaps with those of another transaction. In such a situation, it is likely that successive locking operations performed by T will perform the same lock state transition as another transaction. This likelihood results because the overlapping of the transaction's working sets correspond to shared paths in an object graph. If two transactions follow the same path but not at the same time, then the second will meet the same lock state, installed by the previous transaction, for all of the objects on that path. FIG. 5 illustrates overlapping of similar transaction paths for the three transactions $T_1$, $T_2$ and $T_3$. On the portion of the path that overlaps, each transaction will have a hit on their lock state transition cache if they follow the overlapping portion of the path in sequential order. The same heuristic applies when releasing the locks of a transaction.

In another embodiment, use of the TILS is avoided when performing lock operations. Assuming the caching mechanism just described, a new lock state is allocated whenever there is a cache miss (i.e., the lock state is not in the cache). The TILS is used at garbage collection time only, to eliminate redundant lock states.

Thus, a method and apparatus for locking for transaction processing systems is described in conjunction with one or more specific embodiments. The invention is defined by the claims and their full scope of equivalents.

What is claimed is:

1. A method configured to manage access to a plurality of resources comprising:

obtaining one or more transactions that access at least one resource from a plurality of resources;

obtaining at least one lock state, wherein said at least one lock state represents a state in which said at least one resource can be locked;

obtaining at least one set of lock states, and where each set of lock states comprises said at least one lock state attributed to said at least one resource;

obtaining a request to lock one of said at least one resource;

obtaining an association of said one of said at least one resource with one of said at least one lock state; and obtaining an association of at least one of said one or more transactions with said one of said at least one lock state.

2. The method of claim 1 further comprises:

using a lock manager comprising a set of routines for controlling access to said plurality of resources.

3. The method of claim 1, wherein said obtaining at least one lock state further comprises resolving ownership conflicts of said at least one lock state.

4. The method of claim 3 further comprising:

denying any transaction of said one or more transactions access to said resource if said any transaction conflicts with said one or more transactions.

5. The method of claim 1 wherein said at least one set of lock states is stored in a table of sets.

6. The method of claim 1 wherein said obtaining an association of said one of said at least one resource with one of said at least one lock state comprises computing new lock states.

7. The method of claim 1 wherein said obtaining an association of at least one of said one or more transactions with said one of said at least one lock state comprises managing a queue of lock requests from said one or more transactions.

8. A system comprising
a processor;
a memory coupled to said processor;
code executed by said processor configured to manage access to a resource;
said code comprising:
   obtaining one or more transactions that access at least one resource from a plurality of resources;
   obtaining at least one lock state, wherein said at least one lock state represents a state in which said at least one resource can be locked;
   obtaining at least one set of lock states, wherein each set of lock states comprises said at least one lock state attributed to said at least one resource;
   obtaining a request to lock one of said at least one resource;
   obtaining an association of said one of said at least one resource with one of said at least one lock state; and
   obtaining an association of at least one of said one or more transactions with said one of said at least one lock state.

9. The system of claim 8 further comprising:
using a lock manager comprising a set of routines for controlling access to said plurality of resources.

10. The system of claim 8, wherein obtaining at least one lock state comprises resolving ownership conflicts of said at least one lock state.

11. The system of claim 10 further comprising:
denying any transaction of said one or more transactions access to said resource if said any transaction conflicts with said one or more transactions.

12. The system of claim 8 wherein said at least one set of lock states is stored in a table of sets.

13. The system of claim 8 wherein said obtaining an association of said one of said at least one resource with one of said at least one lock state comprises computing new lock states.

14. The system of claim 8 wherein said obtaining an association of at least one of said one or more transactions with said one of said at least one lock state comprises managing a queue of lock requests from said one or more transactions.

15. A computer program product comprising a computer usable medium having computer readable code embedded therein for managing access to a plurality of resources, said computer readable code configured to cause a computer to:
   obtain one or more transactions that access at least one resource from a plurality of resources;
   obtain at least one lock state, wherein said at least one lock state represents a state in which said at least one resource can be locked;
   obtain at least one set of lock states, wherein each set of lock states comprises said at least one lock state attributed to said at least one resource;
   obtain a request to lock one of said at least one resource;
   obtain an association of said one of said at least one resource with one of said at least one lock state; and
   obtain an association of at least one of said one or more transactions with said one of said at least one lock state.

16. The computer program product of claim 15 further comprising:
computer readable code configured to cause said computer to use a lock manager comprising a set of routines for controlling access to said plurality of resources.

17. The computer program product of claim 15, wherein said obtain at least one lock state comprises resolving ownership conflicts of said at least one lock state.

18. The computer program product of claim 17 further comprising:
computer readable code configured to cause said computer to deny any transaction of said one or more transactions:
access to said resource if said any transaction conflicts with said one or more transactions.

19. The computer program product of claim 15 wherein said at least one set of lock states is stored in a table of sets.

20. The computer program product of claim 15 wherein said obtain an association of said one of said at least one resource with one of said at least one lock state comprises computing new lock states.

21. The computer program product of claim 15 wherein said obtain an association of at least one of said one or more transactions with said one of said at least one lock state comprises managing a queue of lock requests from said one or more transactions.

* * * * *